US012005774B2

(12) United States Patent
Morooka

(10) Patent No.: US 12,005,774 B2
(45) Date of Patent: Jun. 11, 2024

(54) FUEL TANK

(71) Applicant: YACHIYO INDUSTRY CO., LTD., Saitama (JP)

(72) Inventor: Kazuyoshi Morooka, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/627,809

(22) PCT Filed: Jul. 1, 2020

(86) PCT No.: PCT/JP2020/025924
§ 371 (c)(1),
(2) Date: Jan. 17, 2022

(87) PCT Pub. No.: WO2021/010172
PCT Pub. Date: Jan. 21, 2021

(65) Prior Publication Data
US 2022/0266682 A1 Aug. 25, 2022

(30) Foreign Application Priority Data

Jul. 18, 2019 (JP) .................................. 2019-132621

(51) Int. Cl.
*B60K 15/03* (2006.01)
*B29C 49/20* (2006.01)
*B29L 31/00* (2006.01)

(52) U.S. Cl.
CPC ........ *B60K 15/03177* (2013.01); *B29C 49/20* (2013.01); *B29C 2049/2013* (2013.01); *B29L 2031/7172* (2013.01)

(58) Field of Classification Search
CPC ............ B60K 15/073; B60K 15/03177; B60K 2015/03032; B60K 2015/03328;
(Continued)

(56) References Cited

U.S. PATENT DOCUMENTS

2002/0121517 A1* 9/2002 Aoki ................. B60K 15/03177
220/562
2004/0079752 A1* 4/2004 Suzuki .................. B29C 66/232
220/4.13
(Continued)

FOREIGN PATENT DOCUMENTS

CN 104 986 033 A 10/2015
JP 2011-148337 A 8/2011
(Continued)

OTHER PUBLICATIONS

International Search Report and Written Opinion of the International Search Report for PCT/JP2020/025924 dated Sep. 1, 2020.
(Continued)

*Primary Examiner* — Stephen J Castellano
(74) *Attorney, Agent, or Firm* — Kenealy Vaidya LLP

(57) ABSTRACT

A fuel tank has a built-in component with a head portion, a neck portion, and a shoulder portion, and has the built-in component anchored to a tank body with a parison wrapped around the neck portion during molding. The fuel tank includes a deformation prevention structure configured to prevent a wrapping parison portion wrapped around the neck portion from being deformed due to pressure acting on the tank body. The deformation prevention structure is configured to include one of a stepped portion provided in the shoulder portion, a convex portion, and a recess.

3 Claims, 20 Drawing Sheets

(58) Field of Classification Search
CPC .......... B60K 2015/03453; B29C 49/20; B29C 2049/2013
See application file for complete search history.

(56) References Cited

U.S. PATENT DOCUMENTS

| | | |
|---|---|---|
| 2006/0102634 A1 | 5/2006 | Potter et al. |
| 2011/0174946 A1 | 7/2011 | Araya et al. |
| 2015/0217635 A1* | 8/2015 | Nakane .................. B29C 49/20 220/562 |
| 2018/0311885 A1 | 11/2018 | Kobori |

FOREIGN PATENT DOCUMENTS

| | | |
|---|---|---|
| JP | 2013-060096 A | 4/2013 |
| JP | 2014-046676 A | 3/2014 |
| JP | 2015-102083 A | 6/2015 |
| WO | 2017/069029 A1 | 4/2017 |
| WO | 2018/225413 A1 | 12/2018 |
| WO | 2021/010172 A1 | 1/2021 |

OTHER PUBLICATIONS

International Preliminary Report on Patentability for PCT/JP2020/025924 dated Jul. 13, 2021.
The Extended European Search Report for the related European Patent Application No. 20840996.1 dated Aug. 3, 2023.

* cited by examiner

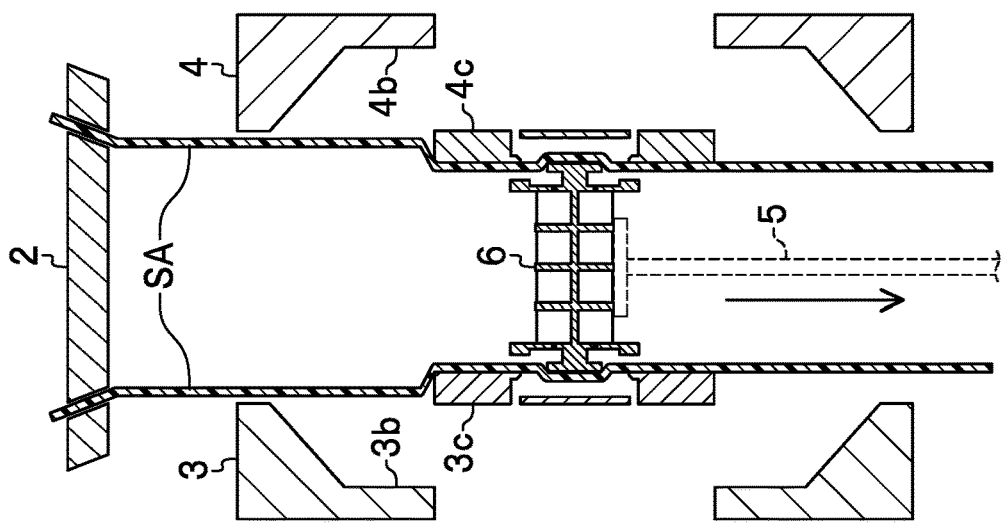
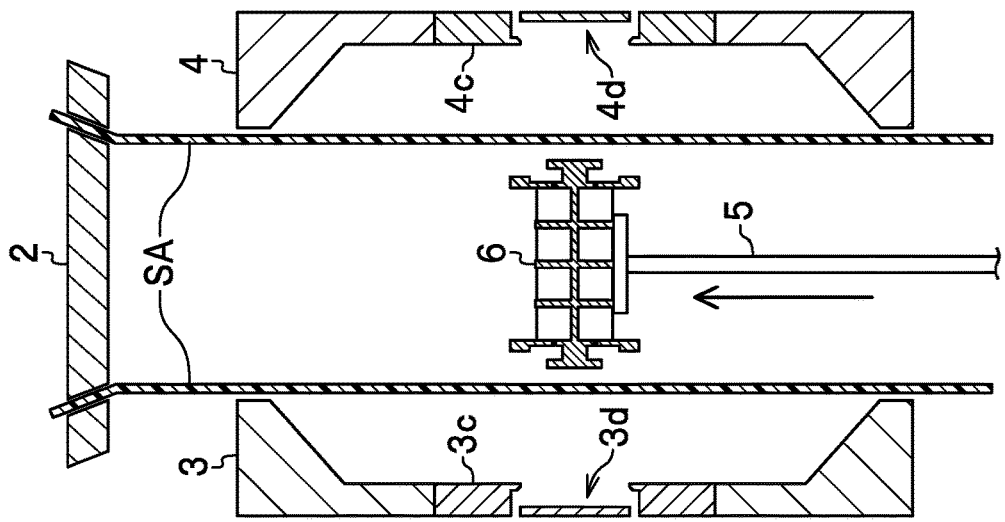
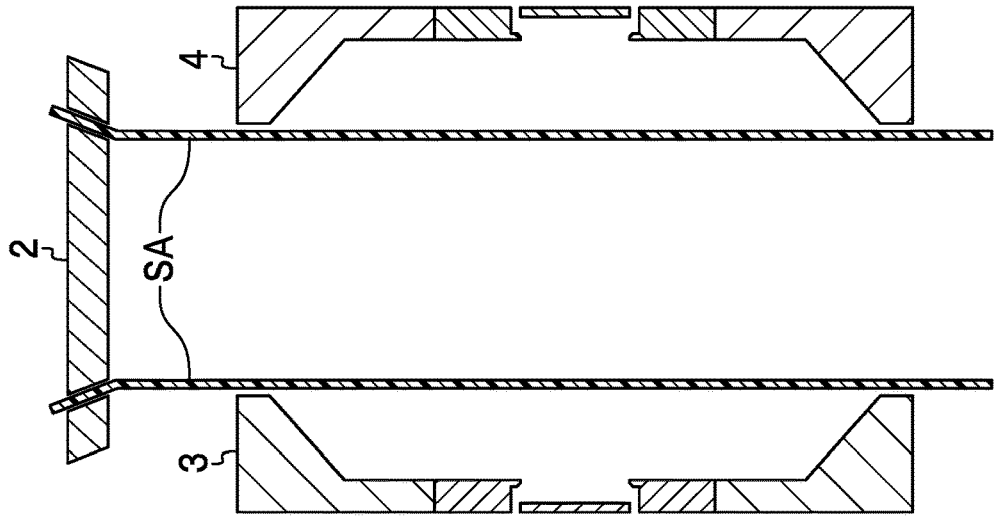

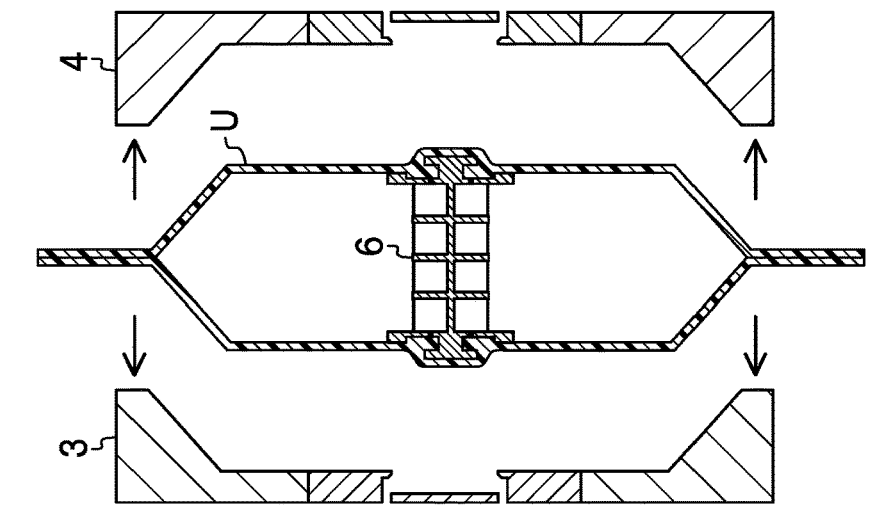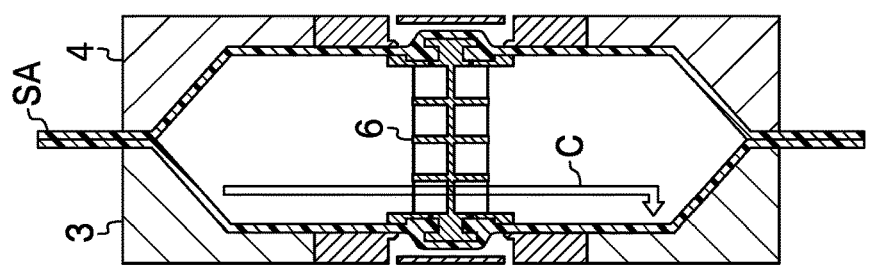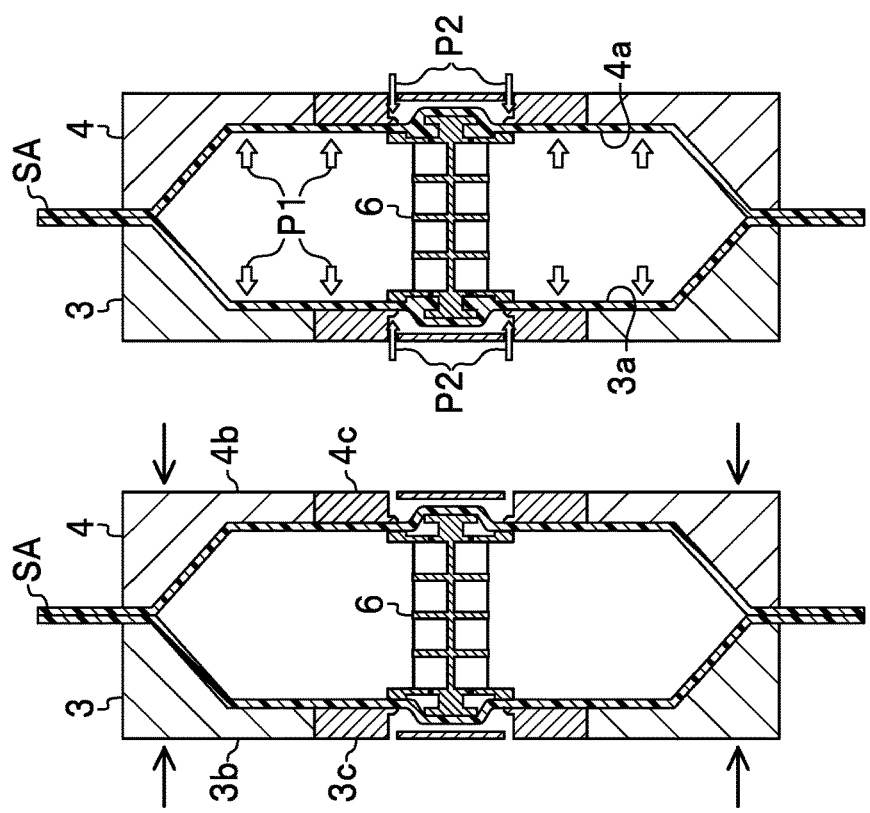

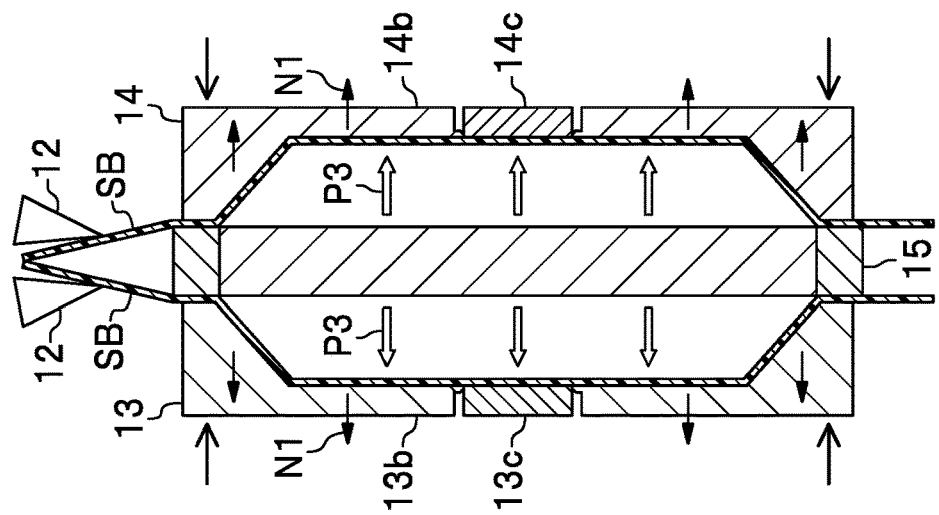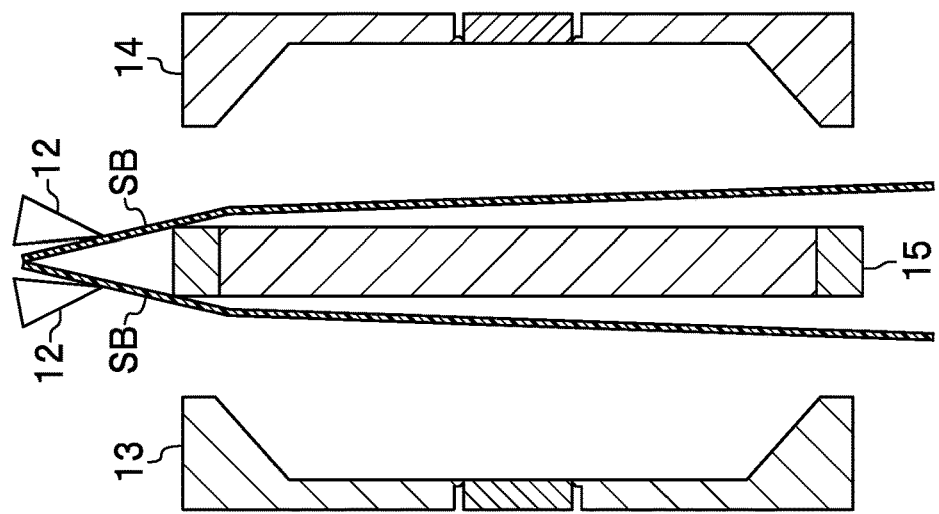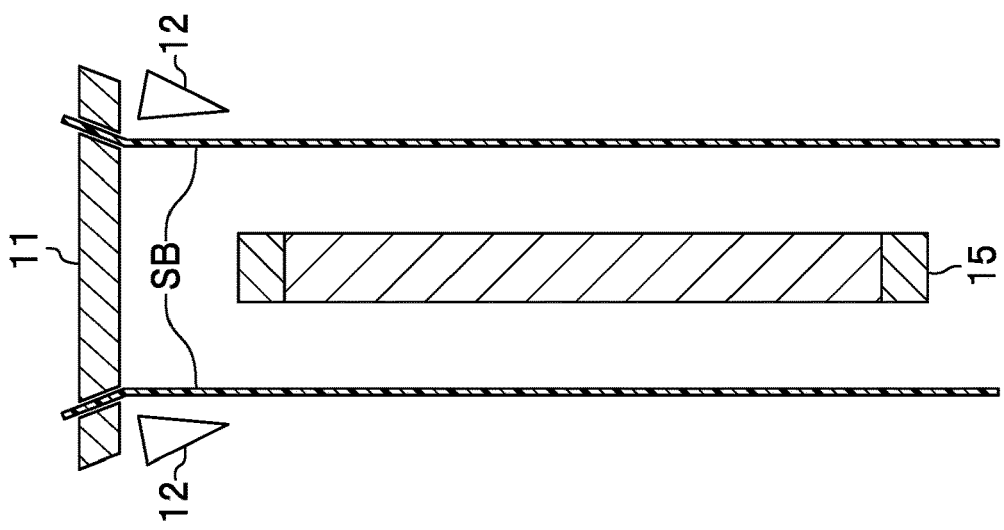

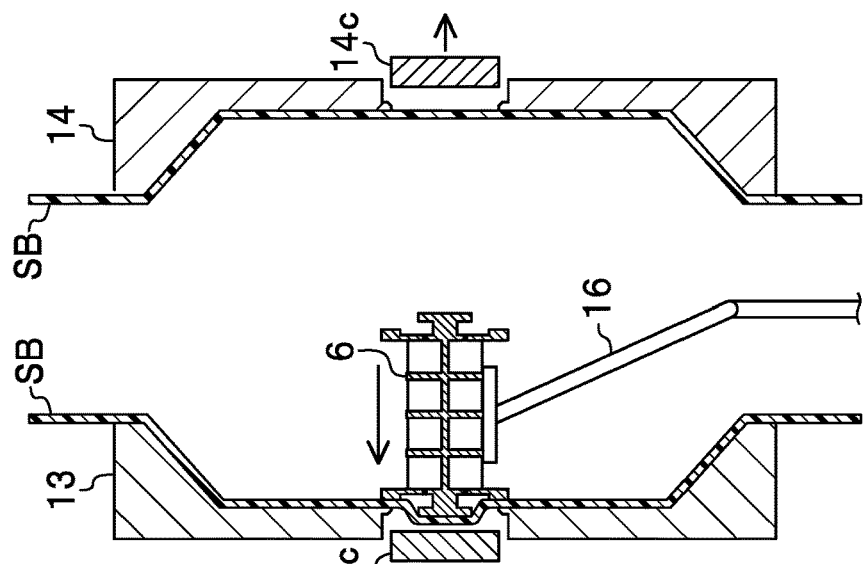
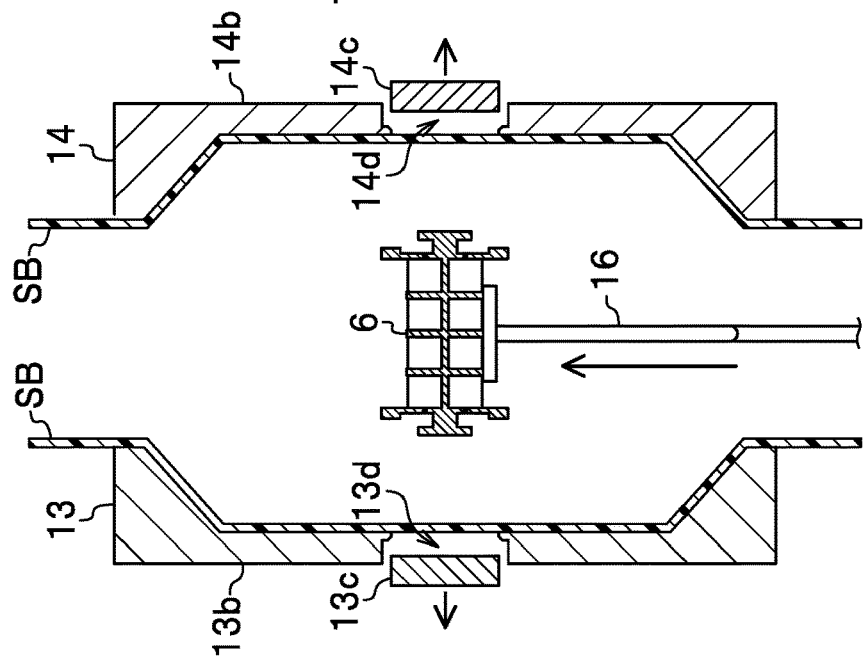
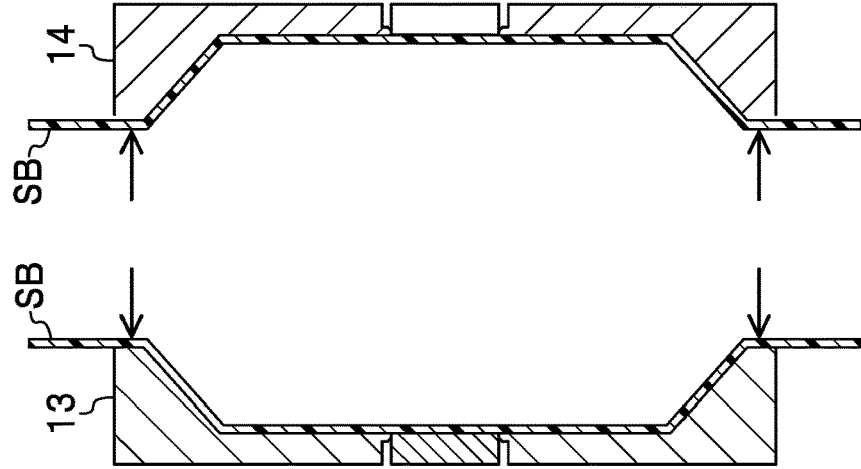

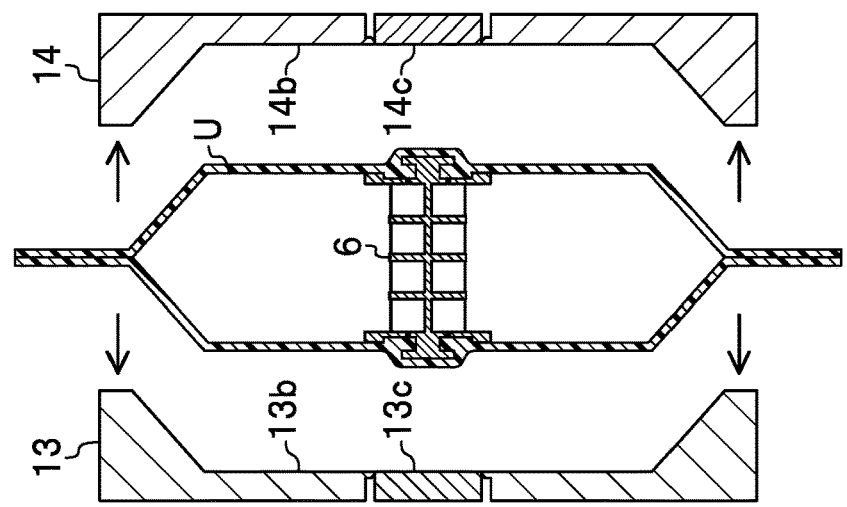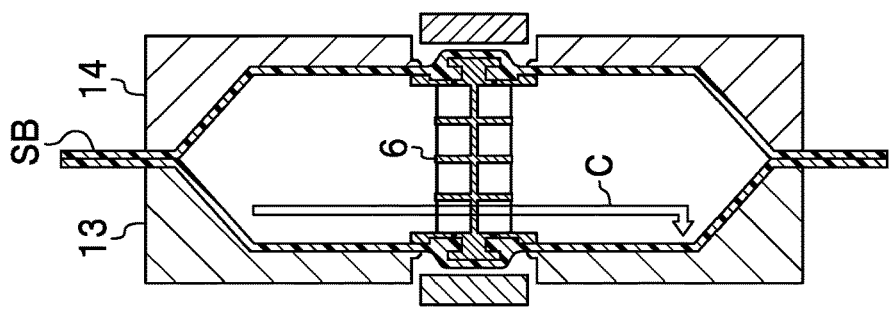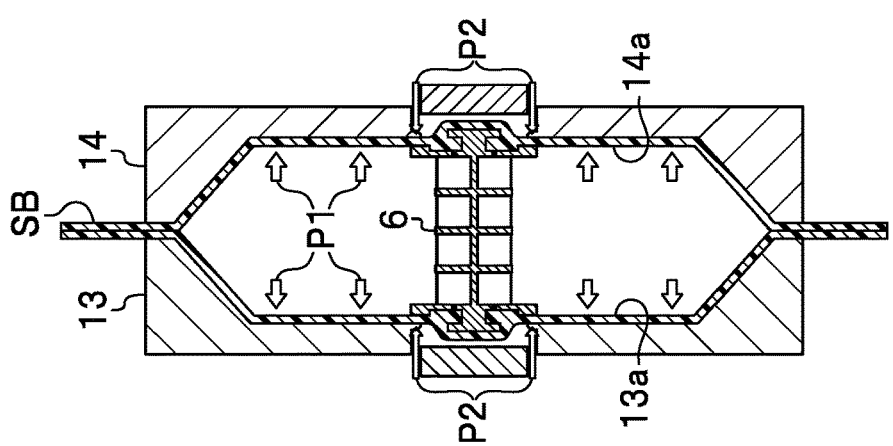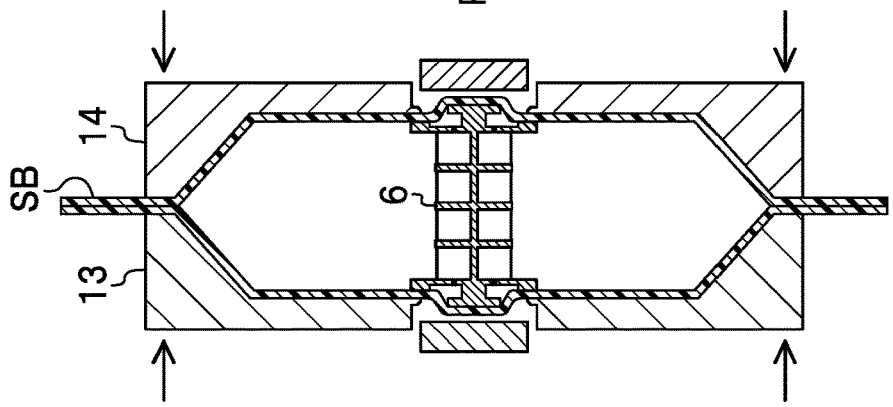

FUEL TANK

CROSS-REFERENCE TO RELATED APPLICATIONS

This application is a U.S. National Stage Application under 35 U.S.C § 371 of International Patent Application No. PCT/JP2020/025924 filed Jul. 1, 2020, which claims the benefit of priority to Japanese Patent Application No. 2019-132621 filed Jul. 18, 2019, the disclosures of all of which are hereby incorporated by reference in their entireties.

TECHNICAL FIELD

The present invention relates to a fuel tank.

BACKGROUND ART

A method has been known for attaching a component, such as a valve, to a blow-molded product, such as a fuel tank of an automobile, as a built-in component. For example, Patent Document 1 describes a fuel tank containing a built-in component with a head portion, a neck portion, and a shoulder portion. This fuel tank has the built-in component anchored thereto with air blown from outside during molding to shape a parison along the neck portion.

PRIOR ART DOCUMENT

Patent Document

Patent Document 1: International Patent Application Publication No. 2018/225413

SUMMARY OF THE INVENTION

Problems to be Solved

It is desirable that the strength of anchorage between a tank body of the fuel tank and the built-in component is high, but the strength of anchorage is desired to be further improved because positive pressure and negative pressure act on the tank body due to external factors such as air temperature.

The present invention has been devised from such a viewpoint, and is intended to provide a fuel tank to increase the strength of anchorage between the tank body and the built-in component.

Solution to Problems

In order to solve the above problems, the present invention provides a fuel tank having a built-in component with a head portion, a neck portion, and a shoulder portion, and having the built-in component anchored to a tank body with a parison wrapped around the neck portion during molding, wherein the head portion is entirely covered by the parison, and the fuel tank includes a deformation prevention structure provided on a surface of the shoulder portion, facing the neck portion, and configured to prevent a wrapping parison portion wrapped around the neck portion from being deformed due to pressure acting on the tank body, and the deformation prevention structure is configured to include at least one of a stepped portion and a convex portion.

According to the present invention, the deformation prevention structure prevents the wrapping parison portion wrapped around the neck portion of the built-in component from being deformed so that the strength of anchorage between the tank body and the built-in component is increased.

In addition, the neck portion preferably erects from a surface of the shoulder portion to exhibit a columnar shape. Further, the deformation prevention structure may be preferably a rigid member integrally molded so as to cover, from outside, the head portion, the neck portion, and the wrapping parison portion wrapped around the neck portion. In this way, the deformation prevention structure can be easily formed.

Advantageous Effects of the Invention

According to the fuel tank of the present invention, the strength of anchorage between the tank body and the built-in component is increased.

BRIEF DESCRIPTION OF DRAWINGS

FIG. 10A is a diagram to illustrate a step of injecting a parison in a method of manufacturing a fuel tank with the first fuel tank manufacturing device;

FIG. 10B is a diagram to illustrate a step of putting in the built-in component in the method of manufacturing a fuel tank with the first fuel tank manufacturing device;

FIG. 10C is a diagram to illustrate a step of provisionally setting the built-in component in the method of manufacturing a fuel tank with the first fuel tank manufacturing device;

FIG. 11A is a diagram to illustrate a step of closing a molding die in the method of manufacturing a fuel tank with the first fuel tank manufacturing device;

FIG. 11B is a diagram to illustrate a step of blow molding in the method of manufacturing a fuel tank with the first fuel tank manufacturing device;

FIG. 11C is a diagram to illustrate a step of cooling the parison in the method of manufacturing a fuel tank with the first fuel tank manufacturing device;

FIG. 11D is a diagram to illustrate a step of opening the molding die in the method of manufacturing a fuel tank with the first fuel tank manufacturing device;

FIG. 13A is a diagram to illustrate a step of feeding a parison in a method of manufacturing a fuel tank with a second fuel tank manufacturing device;

FIG. 13B is a diagram to illustrate a step of feeding the parison in the method of manufacturing a fuel tank with the second fuel tank manufacturing device;

FIG. 13C is a diagram to illustrate a step of primary molding in the method of manufacturing a fuel tank with the second fuel tank manufacturing device;

FIG. 14A is a diagram to illustrate a step of opening a molding die in the method of manufacturing a fuel tank with the second fuel tank manufacturing device;

FIG. 14B is a diagram to illustrate a step of putting in a built-in component in the method of manufacturing a fuel tank with the second fuel tank manufacturing device;

FIG. 14C is a diagram to illustrate a step of putting in the built-in component in the method of manufacturing a fuel tank with the second fuel tank manufacturing device;

FIG. 15A is a diagram to illustrate a step of closing the molding die in the method of manufacturing a fuel tank with the second fuel tank manufacturing device;

FIG. 15B is a diagram to illustrate a step of secondary molding in the method of manufacturing a fuel tank with the second fuel tank manufacturing device;

FIG. 15C is a diagram to illustrate a step of cooling the parison in the method of manufacturing a fuel tank with the second fuel tank manufacturing device;

FIG. 15D is a diagram to illustrate a step of opening the molding die in the method of manufacturing a fuel tank with the second fuel tank manufacturing device;

DETAILED DESCRIPTION OF EMBODIMENTS

First Embodiment

[Fuel Tank of First Embodiment]

Figure 1:
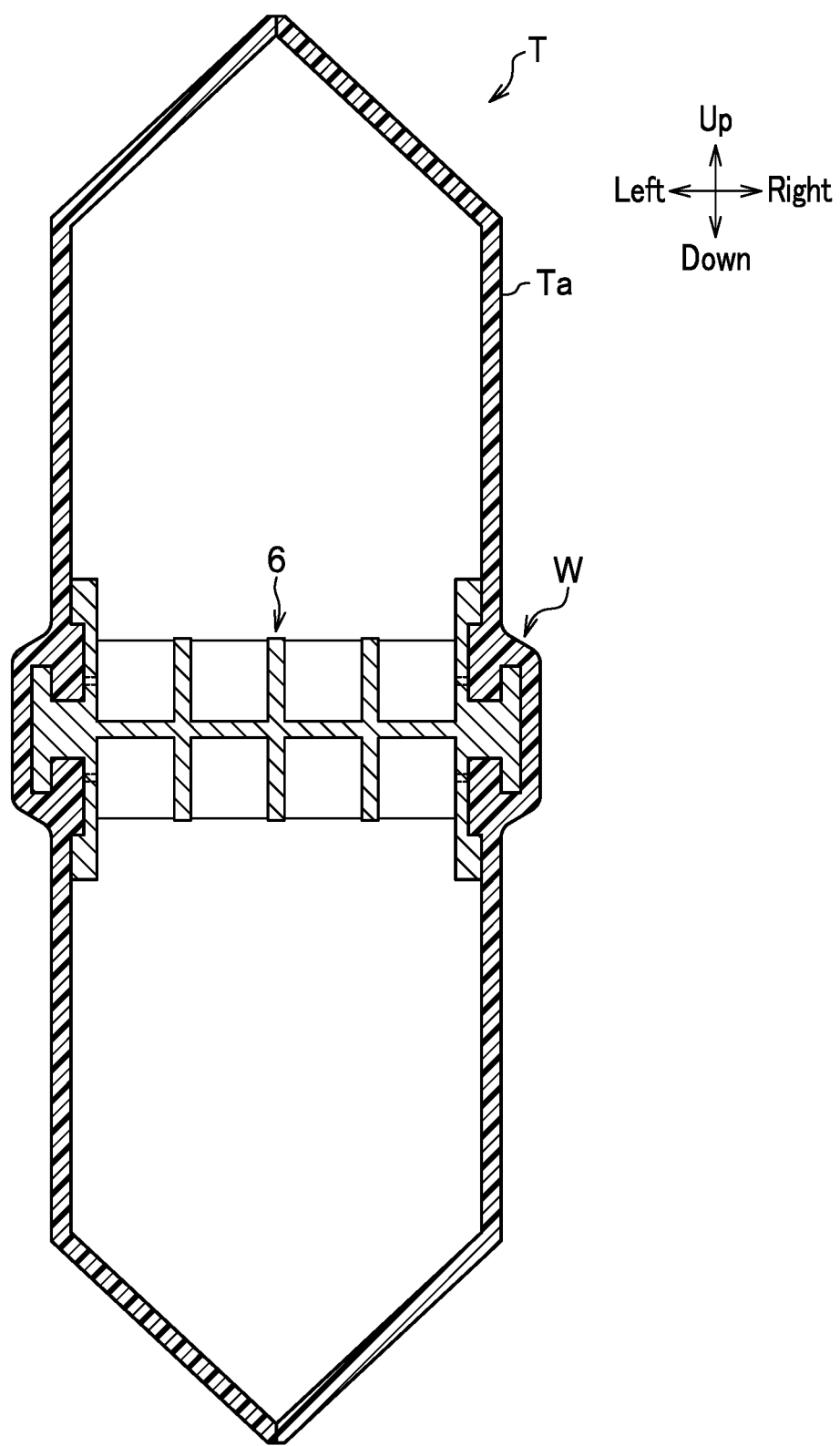
FIG. 1 is a schematic cross-sectional view of a fuel tank according to a first embodiment of the present invention.

A fuel tank T shown in FIG. 1 is a fuel tank to be mounted on a transportation means such as an automobile, a motorcycle, and a ship, and mainly includes a tank body Ta and a built-in component 6. As shown in FIG. 1, the present embodiment exemplarily provides a columnar reinforcing member for maintaining the strength of the fuel tank T, as the built-in component 6, but the built-in component 6 may be a valve, a wave-eliminating plate, or the like. In the following description, "up-down" and "right-left" follow arrows in FIG. 1. These directions are defined for the purpose of illustration and do not limit the present invention. Note that the right-left direction in FIG. 1 corresponds to the open/close direction of a pair of molding dies for manufacturing the fuel tank T.

The tank body Ta is a hollow container made of resin for storing fuel such as gasoline, and has a multi-layer structure including a barrier layer, for example. The tank body Ta is made of mainly a thermoplastic resin such as polyethylene and high-density polyethylene. The tank body Ta is formed by blow molding, for example.

A configuration of the built-in component 6 is described below, with reference to FIGS. 2 to 6. The built-in component 6 is preferably made of a material that can be welded to a parison S (see FIG. 7) as a precursor to the tank body Ta (i.e.; a thermoplastic resin such as PE (polyethylene)). The parison S has a multi-layered structure in cross section made of HDPE (high density polyethylene), EVOH (ethylene-vinyl alcohol copolymer), an adhesive layer and the like.

Figure 2:
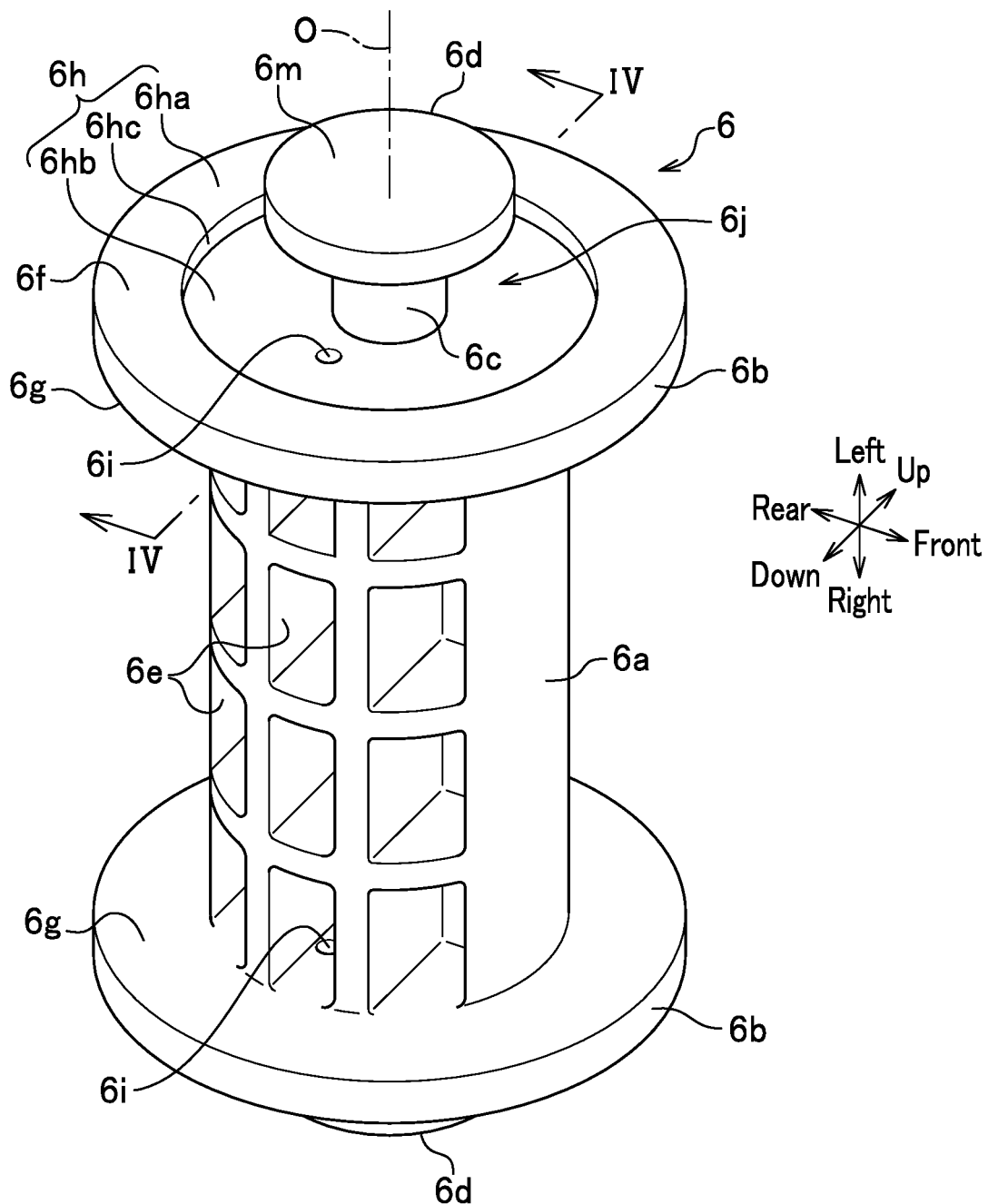
FIG. 2 is an external perspective overview of a built-in component.

As shown in FIG. 2, the built-in component 6 includes a body portion 6a in a columnar shape, shoulder portions 6b formed at both ends of the body portion 6a, neck portions 6c formed on axially outer sides of the shoulder portions 6b, and head portions 6d. The structure of the built-in component 6 is bilaterally symmetrical in mirror image (vertically on the plane of paper). Thus, only one side is described here, unless otherwise specified. In addition, in the description of the built-in component 6, a surface facing the body portion 6a is referred to as a "back surface", and a surface opposite to the "back surface" is referred to as a "front surface."

The body portion 6a in FIG. 2 is a portion as a main body of the built-in component 6, and is symmetrical in mirror image with respect to an anteroposterior axis including an axis 0 as a central axis of the body portion 6a. A plurality of cutout holes 6e are formed in the body portion 6a. The cutout holes 6e are formed to reduce the weight and increase the capacity of the fuel tank T (see FIG. 1).

Figure 3:
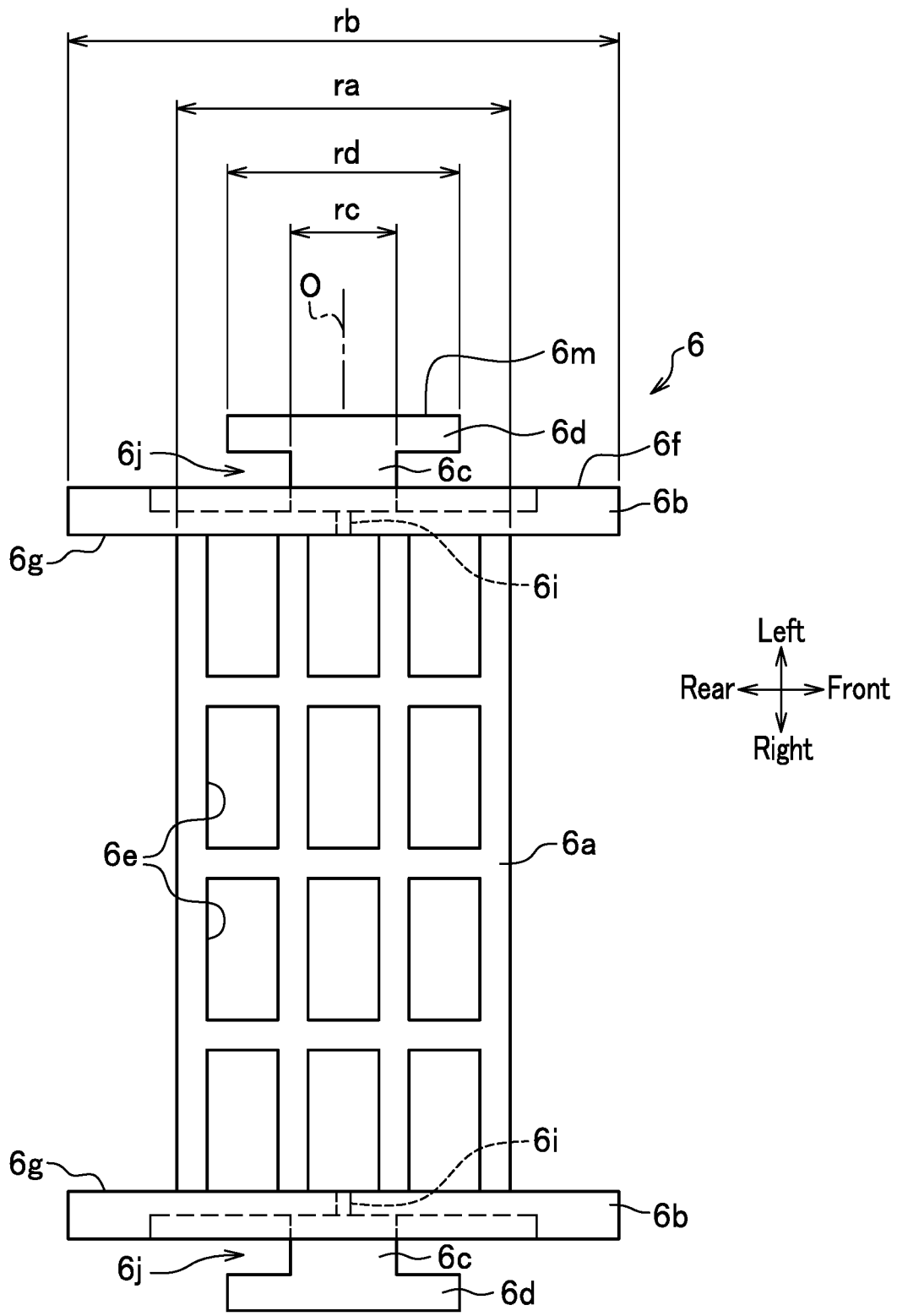
FIG. 3 is a side view of the built-in component.
Figure 7:
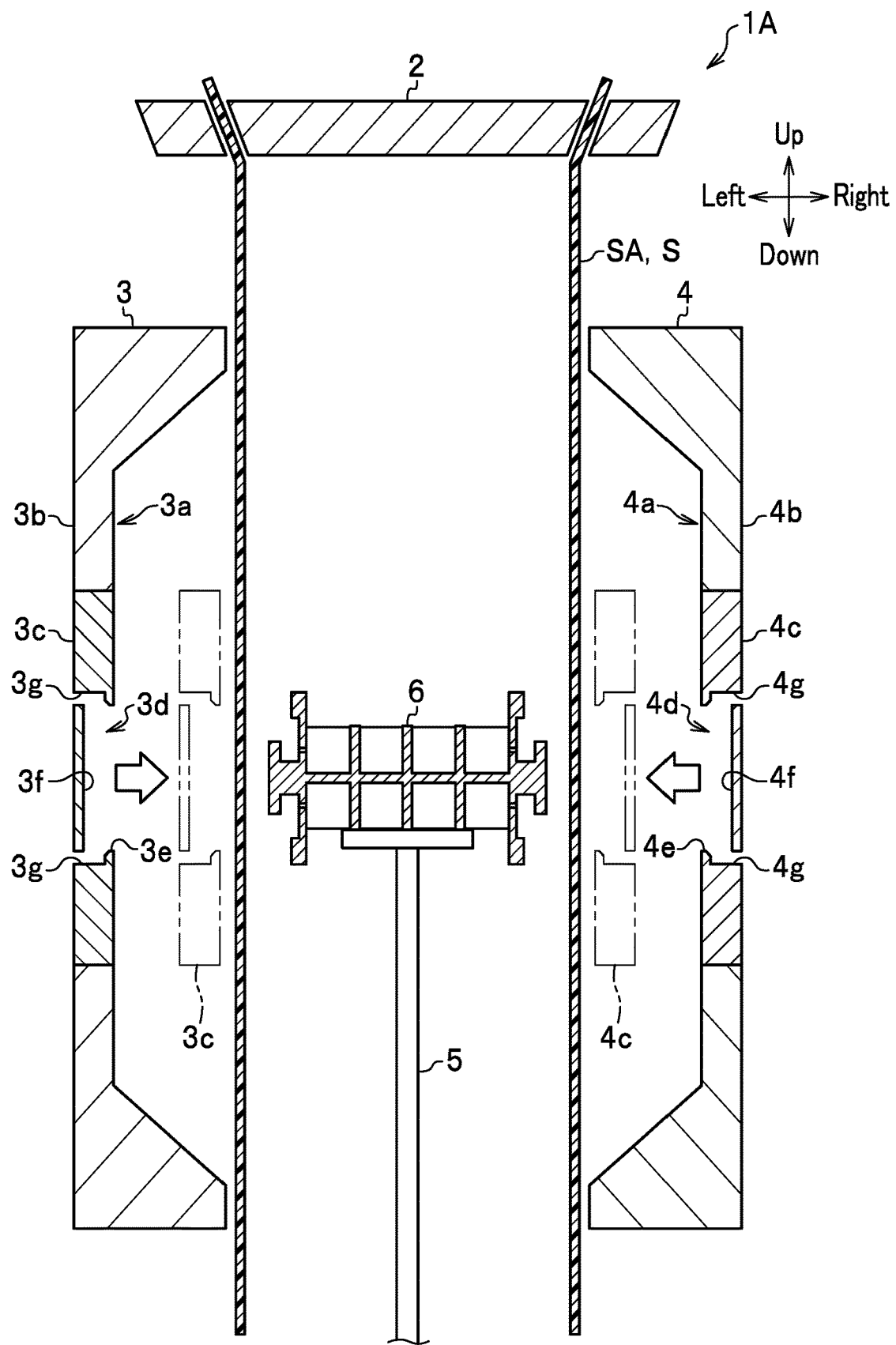
FIG. 7 is a schematic vertical cross-sectional view of a first fuel tank manufacturing device.

The shoulder portion 6b in FIG. 2 is a portion to cover a recess 3d of a first molding die 3 or a recess 4d of a second molding die 4 shown in FIG. 7. The shape and size of the shoulder portion 6b are not particularly limited as long as the shoulder portions 6b can cover the recesses 3d and 4d. The shoulder portion 6b here has a disk shape, and an outer diameter "rb" of the shoulder portion 6b is larger than an outer diameter "ra" of the body portion 6a, as shown in FIG. 3.

The neck portion 6c in FIG. 2 is a portion connecting the shoulder portion 6b with the head portion 6d, and has a smaller diameter than the shoulder portion 6b and head portion 6d. The neck portion 6c here erects from a front surface 6f of the shoulder portion 6b to exhibit a columnar shape.

The head portion 6d in FIG. 2 has a disk shape made of a thin plate. As shown in FIG. 3, an outer diameter "rd" of the head portion 6d is larger than an outer diameter "rc" of the neck portion 6c, and smaller than the outer diameter "rb" of the shoulder portion 6b. Due to such a shape, a gap 6j with the neck portion 6c as a bottom is defined between the shoulder portion 6b and the head portion 6d. The gap 6j is a portion where the parison S enters during molding.

The shape and size of the head 6d are not particularly limited as long as the parison S can enter around the head portion 6d and neck portion 6c to anchor the built-in component 6 to the tank body Ta (see FIG. 1). A portion of the parison S wrapping around the neck portion 6c is referred to as a "wrapping parison portion W" (see FIG. 9). Note that a surface 6m of the head portion 6d may be formed with a plurality of ribs (not shown) erecting in a ring shape, for example. The ribs of the head portion 6d are formed along a circle about the axis 0, for example.

Figure 4:
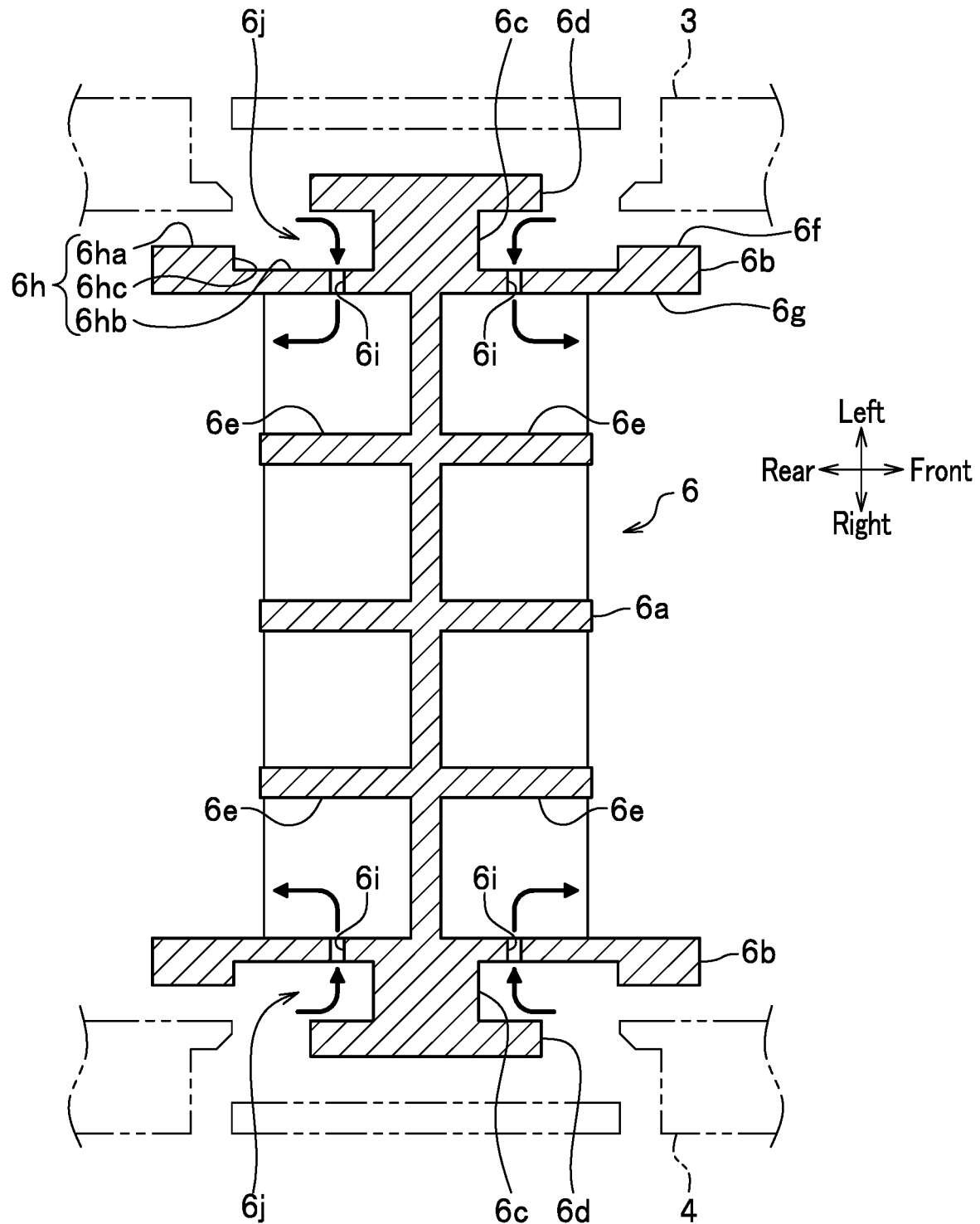
FIG. 4 is a cross-sectional view of the built-in component, taken along a line IV-IV.
Figure 5:
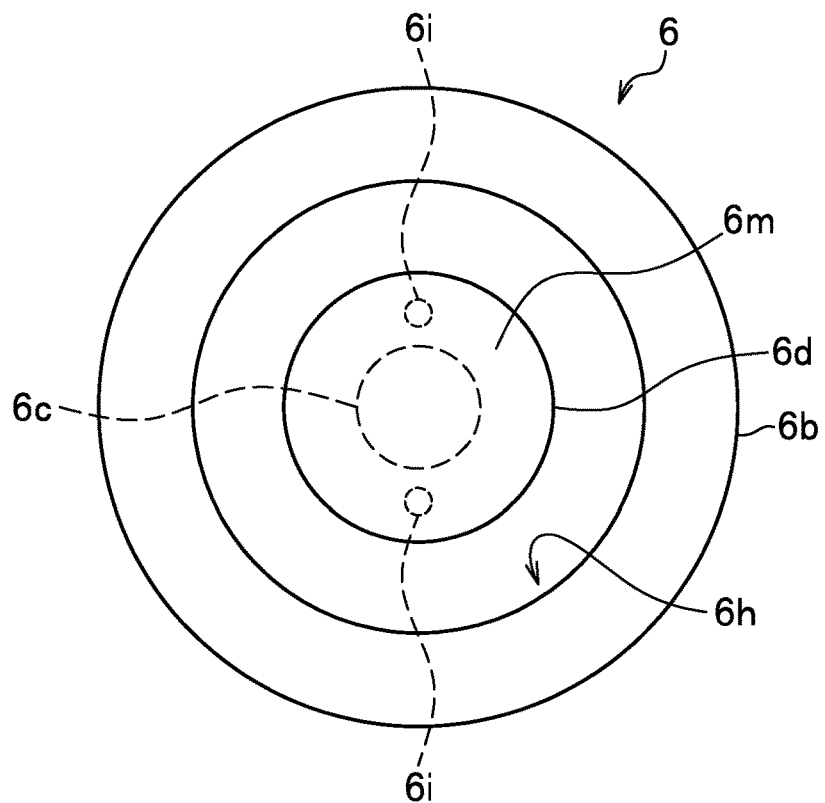
FIG. 5 is a top view of the built-in component.
Figure 6:
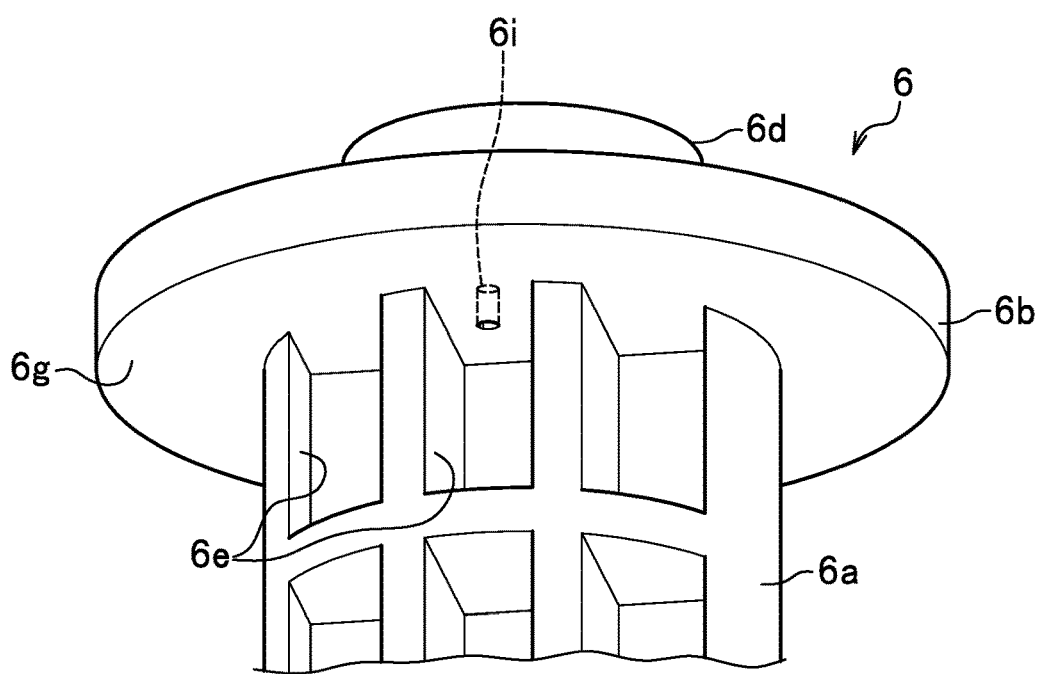
FIG. 6 is an enlarged perspective view of the built-in component.

The shoulder portion 6b is formed, at a portion thereof around the neck portion 6c, with two air vent holes 6i (see FIG. 5). As shown in FIG. 6, the air vent hole 6i communicates with the cutout holes 6e formed in the body portion 6a. As a result, the air in the gap 6j is dischargeable to a back surface 6g of the shoulder portion 6b through the air vent hole 6i (the air flow is indicated by a thick solid arrow in FIG. 4), as shown in FIG. 4.

The shoulder portion 6b is formed, on the front surface 6f thereof, with a stepped portion 6h in an annular shape about the axis 0, as shown in FIG. 2. The stepped portion 6h is a portion where the parison S enters, as well as the gap 6j, during molding. The shape, size, and the like of the stepped portion 6h are not particularly limited as long as the stepped portion 6h can prevent the wrapping parison portion, or the wrapping parison portion W, entered around the neck portion 6c from being deformed due to positive pressure and negative pressure acting on the tank body Ta.

The stepped portion 6h in the present embodiment mainly includes an upper step surface 6ha formed continuously from a peripheral edge of the shoulder portion 6b, a lower step surface 6hb formed lower than the upper step surface 6ha, and an inner wall 6hc formed to extend from the upper step surface 6ha to the lower step surface 6hb. Note that the stepped portion 6h is an example of a deformation prevention structure. The deformation prevention structure may be a structure other than the stepped portion 6h in FIG. 2 (e.g.; a convex portion or a concave portion formed on the front surface 6f of the shoulder portion 6b), as will be described below. The convex portion may be a vertical wall or a protrusion, for example, and the concave portion (not shown) may be a groove or a hole, for example. In addition, the deformation prevention structure may be configured to include at least one of the stepped portion 6h, the convex portion and the concave portion, or these shapes may be used in combination. Further, the stepped portion 6h may be formed to have a plurality of steps.

[Method of Manufacturing Fuel Tank of First Embodiment]

Two types of manufacturing methods are described in the present embodiment. A first one is a method to mold a parison SA in a cylindrical shape (see FIG. 7) to manufacture the fuel tank T (see FIG. 1). A second one is a method to mold parisons SB in a sheet shape (see FIG. 12) to manufacture the fuel tank T.

(Method of Molding with Parison in Cylindrical Shape)

A first fuel tank manufacturing device 1A shown in FIG. 7 is a device to blow-mold the parison SA in a cylindrical shape to manufacture the fuel tank T (see FIG. 1) having a built-in component 6 therein. As shown in FIG. 7, the first fuel tank manufacturing device 1A mainly includes a die 2, a first molding die 3 and a second molding die 4 in a pair, and an elevator 5 to be moved up and down between the first molding die 3 and second molding die 4.

The die 2 is arranged above the first molding die 3 and second molding die 4, and is a supply means to supply the parison SA to the first molding die 3 and second molding die 4. The parison SA has a multi-layered structure in cross section made of HDPE (high density polyethylene), EVOH (ethylene-vinyl alcohol copolymer), an adhesive layer, and the like, and is a precursor to the tank body Ta to constitute the fuel tank T (see FIG. 1).

The first molding die 3 and second molding die 4 in FIG. 7 are molding means for clamp-molding the fuel tank T (see FIG. 1). The first molding die 3 and second molding die 4 are arranged to face each other, and are formed, in the facing surfaces thereof, with molding portions 3a and 4a in a concave shape. The first molding die 3 and second molding die 4 can be moved in the right-left direction so as to be opened and closed, and the parison SA is supplied in a state that the first molding die 3 and second molding die 4 are opened (the state shown in FIG. 7). In addition, the first molding die 3 and second molding die 4 are provided with blow pins (not shown) for blowing air into the first molding die 3 and second molding die 4, so that the air pressure (blow pressure) in the first molding die 3 and second molding die 4 is suitably adjusted by a first positive pressure applying means (not shown). The parison SA is transferred to the molding portions 3a and 4a by the first positive pressure applying means.

The first molding die 3 is configured to be separable, and includes a main body portion 3b and a separating portion 3c that can be separated from the main body portion 3b. Similarly, the second molding die 4 is configured to be separable, and includes a main body portion 4b and a separating portion 4c that can be separated from the main body portion 4b. The separating portions 3c and 4c are respectively formed with the recesses 3d and 4d corresponding to the shapes of both ends of the built-in component 6, and the recesses 3d and 4d partly accommodate the built-in component 6. The recesses 3d and 4d here are formed into a columnar shape, and protrusions 3e and 4e are formed near the entrance. The outer corners of the protrusions 3e and 4e are chamfered. In addition, a plurality of air holes 3g and 4g are provided in bottoms 3f and 4f for the recesses 3d and 4d, respectively, for blowing air into the recesses 3d and 4d, so that the air pressure (blow pressure) in the recesses 3d and 4d is suitably adjusted by a second positive pressure applying means (not shown). Note that the protrusions 3e and 4e may be omitted.

The elevator 5 is a moving means for moving the built-in component 6 to the mounting position. The mounting position here is inside the parison SA in a cylindrical shape and between the separating portions 3c and 4c.

Next, a description is given of operation of the first fuel tank manufacturing device 1A. Before describing the whole process of the method of manufacturing the fuel tank T (see FIG. 1) with the first fuel tank manufacturing device 1A, a description is given of transferring the parison around ends of the built-in component 6.

<Transferring Parison around Ends of Built-in Component>

Figure 8:
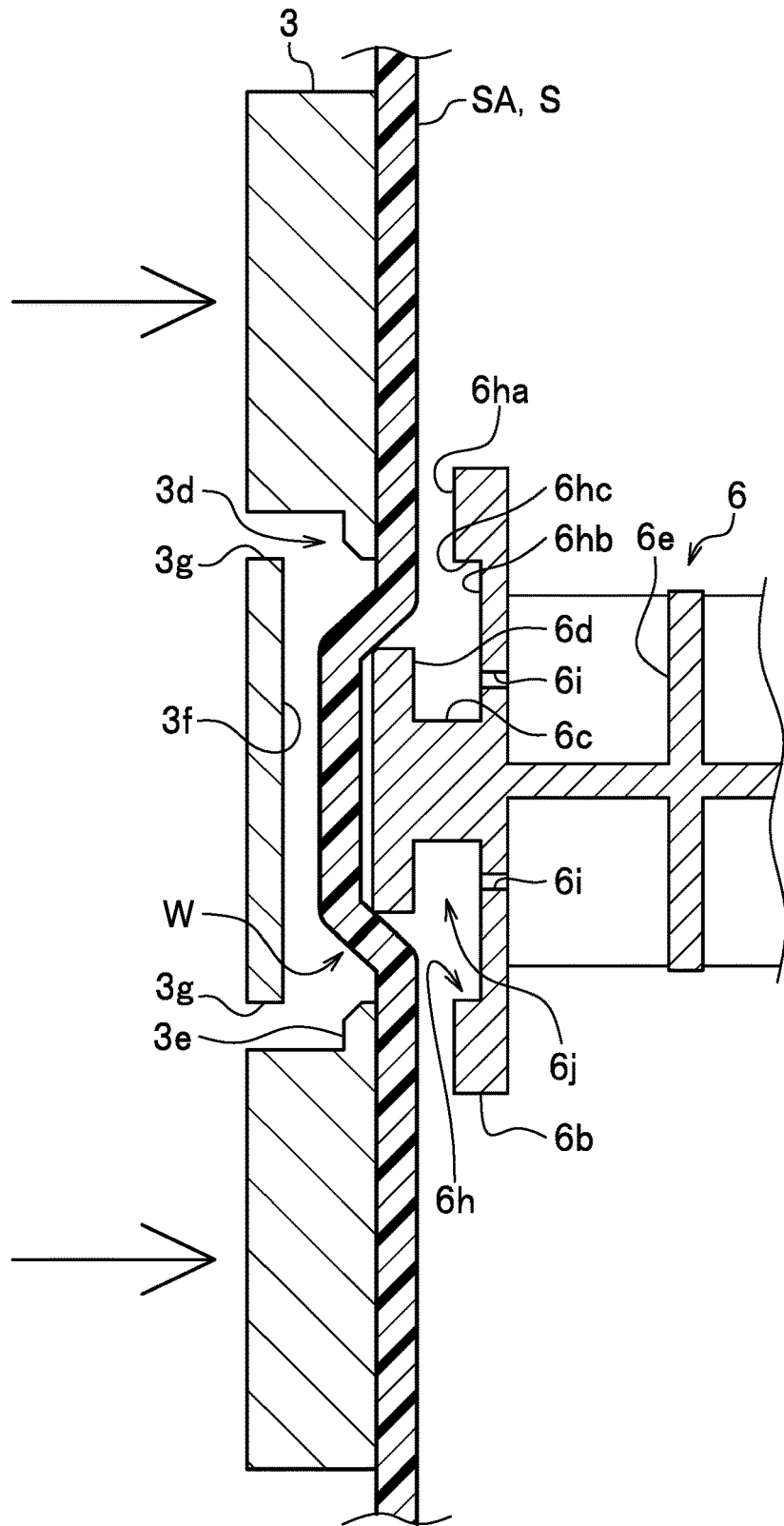
FIG. 8 is a diagram to illustrate transferring a parison around an end of a built-in component during molding.
Figure 9:
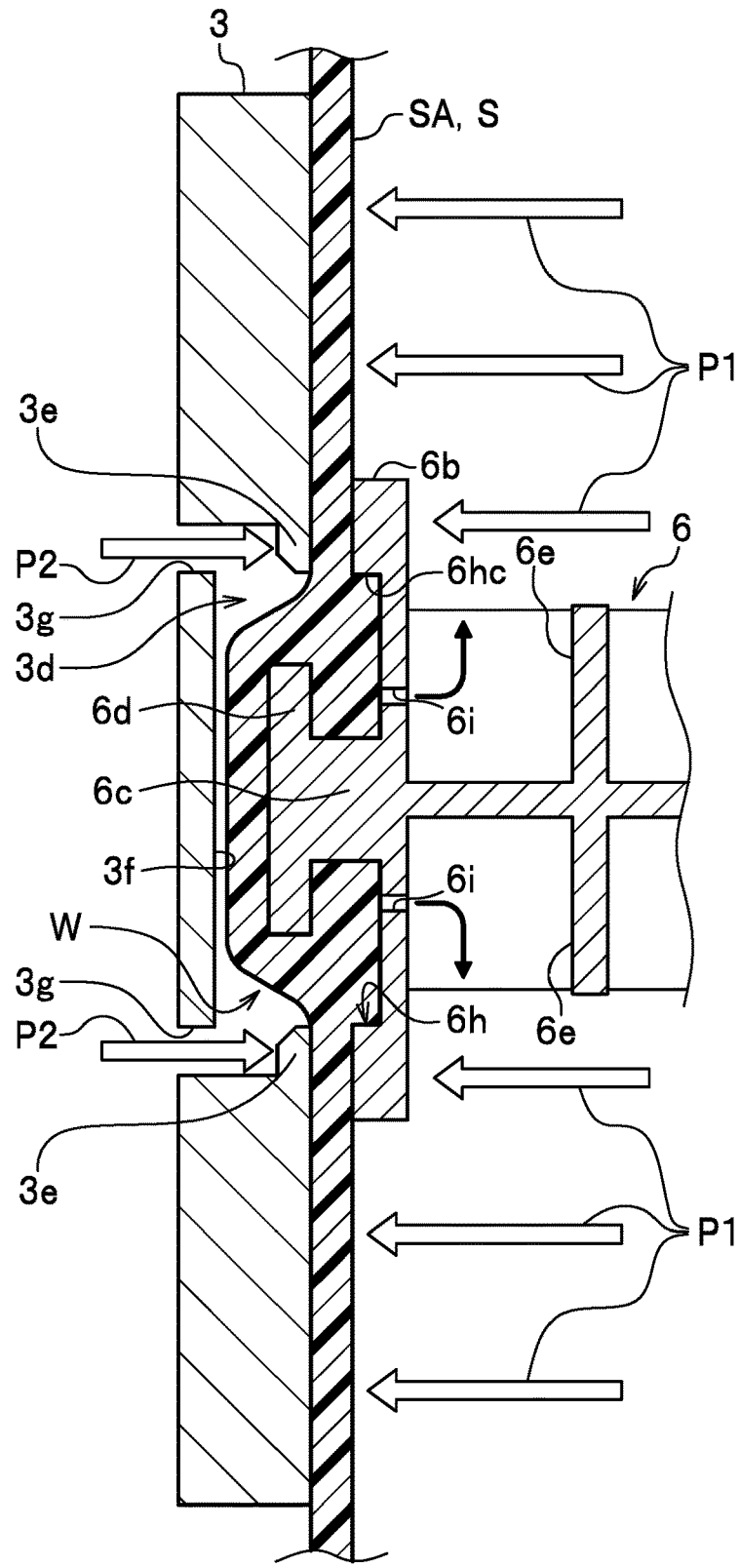
FIG. 9 is a diagram to illustrate transferring the parison around the end of the built-in component during molding.

A description is given of transferring the parison SA around the ends of the built-in component 6 during molding, with reference to FIGS. 8 and 9 (see FIGS. 1 to 7 as required). Note that a description is given here of the first molding die 3, but the same applies to the second molding die 4. In the fuel tank manufacturing process, the first molding die 3 is moved in the arrow direction, as shown in FIG. 8, and then clamed so that the neck portion 6c and head portion 6d of the built-in component 6 are pushed into the recess 3d along with the parison SA.

As shown in FIG. 9, when the shoulder portion 6b contacts the parison SA and covers the opening of the recess 3d, and the neck portion 6c and head portion 6d are completely pushed (accommodated) into the recess 3d, air is blown into the first molding die 3 to generate a positive pressure P1 (first positive pressure) in the parison SA so that the parison SA is transferred to the first molding die 3. In addition, air is blown into the recess 3d from the air hole 3g formed in the recess 3d to generate a positive pressure P2 (second positive pressure) in the recess 3d, so that the parison SA is made to enter into the gap 6j between the shoulder portion 6b and head portion 6d as well as the stepped portion 6h and is then transferred. The air in the gap 6j is discharged through the air vent holes 6i formed in the shoulder portion 6b.

At this time, the parison SA is pressed between the shoulder portion 6b and the protrusion 3e, so that the parison SA and the shoulder portion 6b are welded to each other. In addition, the parison SA is pressed to the head portion 6d by the positive pressure P2, so that the parison SA and the head portion 6d are welded to each other. Note that the built-in component 6 may be pushed toward the recess 3d to hold the parison SA between the head portion 6d and the bottom portion 3f, so that the parison SA and the head portion 6d are welded to each other.

<Step of Injecting Parison>

Next, a description is given of the whole process of the method of manufacturing the fuel tank T with the first fuel tank manufacturing device 1A. The die 2 injects the parison SA in a cylindrical shape into a space between the first molding die 3 and second molding die 4 which are both opened, as shown in FIG. 10A.

<Step of Putting in Built-in Component>

Next, the elevator 5 is moved up, with the built-in component 6 held, to move the built-in component 6 to a mounting position, as shown in FIG. 10B. Here, the mounting position is located inside the parison SA and between the separating portions 3c and 4c.

<Step of provisionally Setting Built-in Component>

Next, the separating portions 3c and 4c of the first molding die 3 and second molding die 4 are moved in a direction of facing each other, to hold the built-in component 6 from both ends, as shown in FIG. 10C. Then, the elevator 5 is moved down, with the built-in component 6 released, and retracts to the initial position. The initial position of the elevator 5 can be any position as long as it does not interfere with the main bodies 3b and 4b of the first molding die 3 and second molding die 4 when they are closed.

<Step of Closing Molding Dies>

Next, the main bodies 3b and 4b of the first molding die 3 and second molding die 4 are moved in the direction of facing each other, and the first molding die 3 and second molding die 4 are clamped, as shown in FIG. 11A.

<Step of Blow Molding>

Next, the first positive pressure applying means (not shown) applies the positive pressure P1 (first positive pressure) from inside the parison SA in the first molding die 3 and second molding die 4, as shown in FIG. 11B. This causes the parison SA to be pressed to the molding portions 3a and 4a of the first molding die 3 and second molding die 4 and transferred. In addition, the second positive pressure applying means (not shown) applies the positive pressure P2 (second positive pressure) from outside the parison SA in the recesses 3d and 4d (see FIG. 7) of the first molding die 3 and second molding die 4. This causes the parison SA to be shaped along the neck portion 6c of the built-in component 6 (see FIG. 9). Note that the means and order of applying the positive pressure P1 and positive pressure P2 are not particularly limited. The positive pressure P2 is preferably set higher than the positive pressure P1.

<Step of Cooling Parison>

Next, a cooling means (not shown) is used to circulate cooling air C in the first molding die 3 and second molding die 4, as shown in FIG. 11C. This causes the parison SA to be cooled and cured.

<Step of Opening Molding Dies>

Next, the first molding die 3 and second molding die 4 are opened and a molded product U is taken out, as shown in FIG. 11D. Then, unnecessary burrs formed at both ends are cut to finish the fuel tank T (see FIG. 1).

(Method of Molding with Sheet-Shaped Parison)

Figure 12:
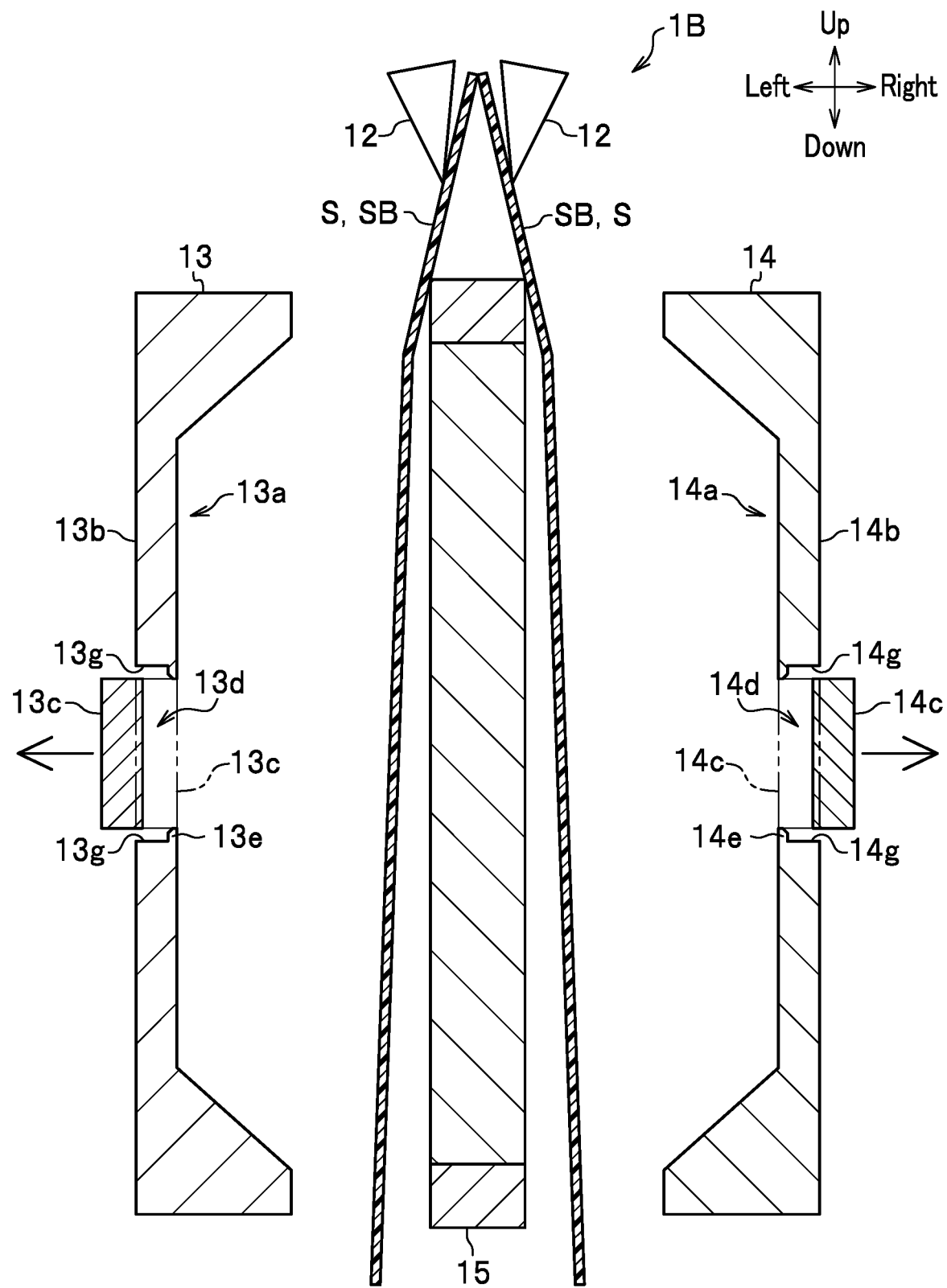
FIG. 12 is a schematic vertical cross-sectional view of a second fuel tank manufacturing device.

A second fuel tank manufacturing device 1B shown in FIG. 12 is a device to blow-mold the parisons SB in a sheet shape to manufacture the fuel tank T (see FIG. 1) having the built-in component 6 (see FIG. 2). The second fuel tank manufacturing device 1B blow-molds the parisons SB in two steps such that the tank body Ta (see FIG. 1) is molded in a first blow-molding, and the parisons SB are shaped onto the built-in component 6 in a second blow-molding.

The second fuel tank manufacturing device 1B mainly includes, as shown in FIG. 12, chucks 12, a pair of first molding die 13 and second molding die 14, an intermediate die 15, and a robot arm 16 (see FIG. 14).

The chucks 12 are devices to push portions, closer to upper ends, of the parisons SB from outside to move the parisons SB toward the intermediate die 15. The parison SB has a multi-layered structure in cross section made of HDPE (high density polyethylene), EVOH (ethylene-vinyl alcohol copolymer), an adhesive layer, and the like, and is a precursor to the tank body Ta constituting the fuel tank T (see FIG. 1).

The first molding die 13, second molding die 14, and intermediate die 15 in FIG. 12 are molding means for clamp-molding the fuel tank T (see FIG. 1). The first molding die 13 and second molding die 14 are arranged to face each other, and molding portions 13a and 14a in a concave shape are formed in the facing surfaces. The intermediate die 15 is movable in the vertical direction or the front-rear direction (front-back direction of the plane of paper in FIG. 12). The intermediate die 15 is located between the first molding die 13 and second molding die 14 in FIG. 12 during the primary molding, and the intermediate mold 15 is removed during the secondary molding.

The first molding die 13 and second molding die 14 can be moved in the right-left direction so as to be opened and closed, and the parisons SB are supplied with the first molding die 13 and second molding die 14 opened (as shown in FIG. 12). In addition, the first molding die 13 and second molding die 14 include blow pins (not shown) for blowing air into the first molding die 13 and second molding die 14 and for removing the air, so that the air pressure (blow pressure) in the first molding die 13 and second molding die 14 is suitably adjusted by the first positive pressure applying means and a first negative pressure applying means, which are not shown. The parisons SB are pressed to the molding portions 13a and 14a by the first positive pressure applying means and first negative pressure applying means.

The first molding die 13 is configured to be separable, and includes a main body portion 13b and a separating portion 13c that can be separated from the main body portion 13b.

Likewise, the second molding die 14 is configured to be separable, and includes a main body portion 14b and a separating portion 14c that can be separated from the main body portion 14b. The separating portions 13c, 14c can be moved back with respect to the main body portions 13b, 14b, and recesses 13d, 14d are defined with the separating portions 13c, 14c moved back. The recesses 13d, 14d correspond to the shapes of both ends of the built-in component 6, and partly accommodate the built-in component 6. The recesses 13d, 14d are here defined in a columnar shape, and the main body portions 13b, 14b are formed with protrusions 13e, 14e near the entrances to the recesses 13d, 14d. The outer corners of the protrusions 13e, 14e are chamfered. In addition, a plurality of air holes 13g, 14g for blowing air into the recesses 13d, 14d are respectively formed between the main body portions 13b, 14b and the separating portions 13c, 14c, and air pressure (blow pressure) in the recesses 13d, 14d is suitably adjusted by the second positive pressure applying means (not shown).

The robot arm 16 (see FIG. 14) is a moving means for moving the built-in component 6 to the mounting position. The mounting position here is inside the parisons SB in a sheet shape and between the separating portions 13c, 14c.

Next, a description is given of operation of the second fuel tank manufacturing device 1B. Before describing the whole process of the method of manufacturing the fuel tank T (see FIG. 1) with the second fuel tank manufacturing device 1B, a description is given of transferring the parisons around the ends of the built-in component 6.

<Transferring Parisons around Ends of Built-in Component>

A way of transferring the parisons around the ends of the built-in component 6 with the second fuel tank manufacturing device 1B is the same as the way of transferring the parison with the first fuel tank manufacturing device 1A. That is, the second fuel tank manufacturing device 1B has the positive pressure P2 (second positive pressure) generated in the recesses 13d and 14d formed in the first molding die 13 and second molding die 14, so that the parisons SB are made to enter into the gap 6j between the shoulder portion 6b and head portion 6d as well as the stepped portion 6h and are then transferred (see FIGS. 8 and 9).

<Step of Feeding Parisons>

Next, a description is given of the whole process of the method of manufacturing the fuel tank T with the second fuel tank manufacturing device 1B. A feeding means 11 feeds the parisons SB in a sheet shape to both sides of the intermediate die 15, as shown in FIG. 13A. Next, the chucks 12 hold the portions, closer to the upper ends, of the parisons SB and guide the parisons SB toward the intermediate die 15, as shown in FIG. 13B.

<Step of Primary Molding (Blow-molding)>

Next, the first molding die 13 and second molding die 14 are moved in a direction of facing each other so as to be combined on both sides of the intermediate die 15, and the first molding die 13 and second molding die 14 are clamped, as shown in FIG. 13C. Then, the first negative pressure applying means (not shown) generates a negative pressure N1 in the first molding die 13 and second molding die 14. In addition, a third positive pressure applying means (not shown) applies a positive pressure P3 from inside the parisons SB in the first molding die 13 and second molding die 14. This causes the parisons SB to be pressed to the molding portions 13a and 14a of the first molding die 13 and second molding die 14 and transferred. Here, there is no gap between the main body portion 13b and separating portion 13c of the first molding die 13, so that the parison SB does not leak from between the main body portion 13b and separating portion 13c. Likewise, there is no gap between the main body portion 14b and separating portion 14c of the second molding die 14, so that the parison SB does not leak from between the main body portion 14b and separating portion 14c.

<Step of Opening Molding Dies>

Next, the first molding die 13 and second molding die 14 are opened and the intermediate mold 15 is removed, as shown in FIG. 14A. This causes a space to be defined between the first molding die 13 and second molding die 14. Note that the parisons SB remain transferred to the first molding die 13 and second molding die 14, which are opened.

<Step of Putting in Built-in Component>

Next, the separating portions 13c and 14c of the first molding die 13 and second molding die 14 are moved back with respect to the main body portions 13b and 14b, and recesses 13d and 14d are defined in the first molding die 13 and second molding die 14, as shown in FIG. 14B. In addition, the robot arm 16 is moved up, with the built-in component 6 held, to move the built-in component 6 toward the first molding die 13 and arrange the built-in component 6 in the recess 13d, as shown in FIG. 14C. Then, the robot arm 16 is moved down, with the built-in component 6 released, and retracts to the initial position. The initial position of the robot arm 16 can be any position as long as it does not interfere with the first molding die 13 and second molding die 14 when they are closed.

<Step of Closing Molding Die>

Next, the first molding die 13 and second molding die 14 are moved in the direction of facing each other, and the first molding die 13 and second molding die 14 are clamped, as shown in FIG. 15A.

<Step of Secondary molding (Blow Molding)>

Next, the first positive pressure applying means (not shown) applies the positive pressure P1 (first positive pressure) from inside the parisons SB in the first molding die 13 and second molding die 14, as shown in FIG. 15B. This causes the parisons SB to be pressed to the molding portions 13a and 14a of the first molding die 13 and second molding die 14 and transferred. In addition, the second positive pressure applying means (not shown) applies the positive pressure P2 (second positive pressure) from outside the parisons SB in the recesses 13d and 14d (see FIG. 12) of the first molding die 13 and second molding die 14. This causes the parisons SB to be shaped along the neck portion 6c of the built-in component 6. Note that the means and order of applying the positive pressure P1 and positive pressure P2 are not particularly limited. The positive pressure P2 is preferably set higher than the positive pressure P1.

<Step of Cooling Parison>

Next, a cooling means (not shown) is used to circulate the cooling air C in the first molding die 13 and second molding die 14, as shown in FIG. 15C. This causes the parisons SB to be cooled and cured.

<Step of Opening Molding Dies>

Next, the first molding die 13 and second molding die 14 are opened and the molded product U is taken out, as shown in FIG. 15D. Then, unnecessary burrs formed at both ends are cut to finish the fuel tank T (see FIG. 1).

Here, in a case of a conventional fuel tank, the resin around the neck portion may be deformed (displaced) so as to be separated outward in the radial direction from the neck portion, when positive pressure and negative pressure act on the tank body, to have a risk of the strength of anchorage between the built-in component and the tank body being reduced. However, according to the first embodiment described above, the parison S enters the gap 6j and the stepped portion 6h to prevent the resin around the neck portion 6c of the built-in component 6 (wrapping parison portion W) from being deformed. More specifically, the present embodiment has the resin around the neck portion 6c (wrapping parison portion W) received by the inner wall 6hc (see FIG. 8) of the stepped portion 6h, to prevent the resin around the neck portion 6c from being deformed (displaced) outward in the radial direction from the neck portion 6c. This increases the strength of anchorage between the built-in component 6 and the tank body Ta. In addition, the deformation prevention structure can be easily formed because the only thing to do is to provide the stepped portion 6h.

Second Embodiment

Figure 16A:
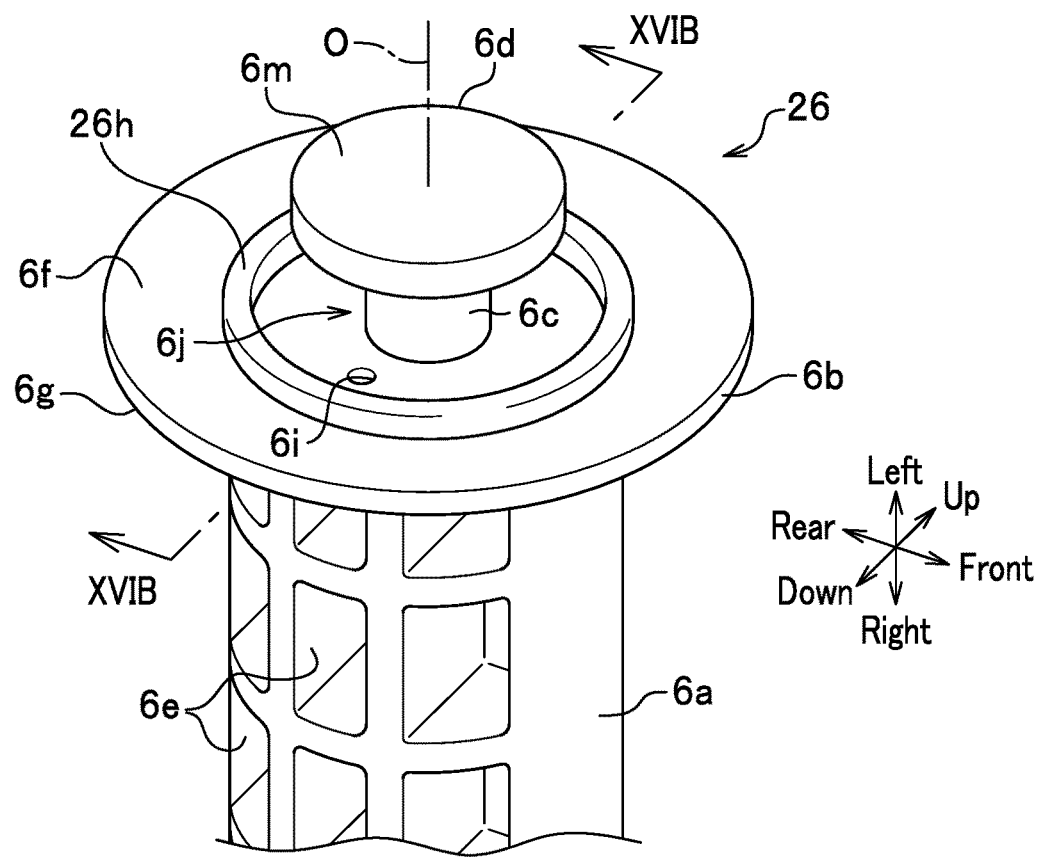
FIG. 16A is an overall perspective view of the built-in component included in the fuel tank according to a second embodiment of the present invention.
Figure 16B:
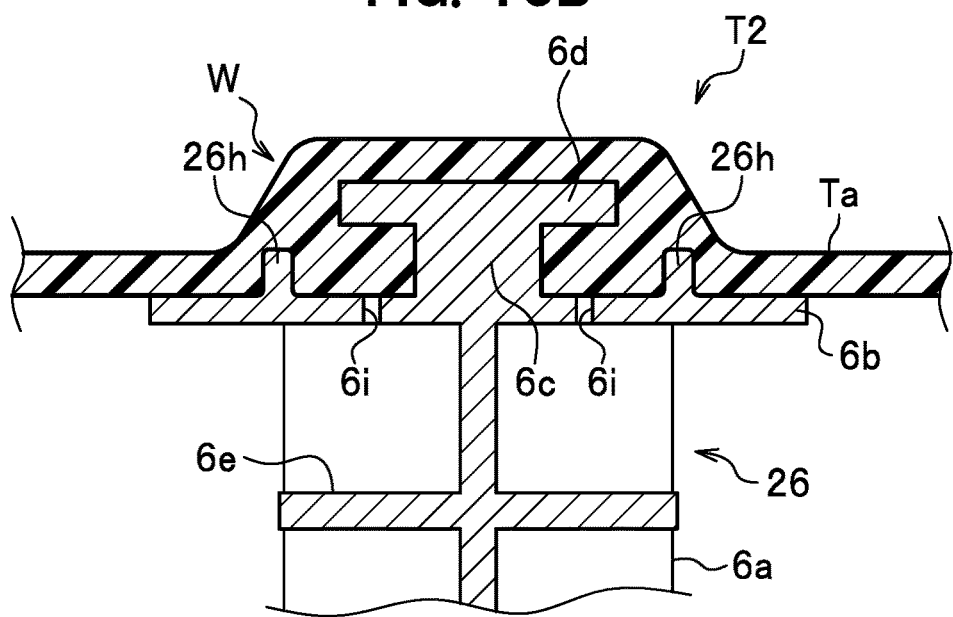
FIG. 16B is an enlarged cross-sectional view of the fuel tank according to the second embodiment of the present invention.

A second embodiment has a first convex portion 26h formed on the front surface 6f of the shoulder portion 6b, as a deformation prevention structure, as shown in FIGS. 16A and 16B. The first convex portion 26h has an annular shape about the axis 0, and is formed to surround the whole circumference of the neck portion 6c. The first convex portion 26h has a rectangular shape in cross section.

The second embodiment described above gives advantageous effects substantially equivalent to those of the first embodiment. That is, the parison S enters the space defined by the gap 6j and the first convex portion 26h, to prevent the resin around the neck portion 6c of a built-in component 26 (wrapping parison portion W) from being deformed. More specifically, the present embodiment has the resin around the neck portion 6c (wrapping parison portion W) received by the first convex portion 26h, to prevent the resin around the neck portion 6c from being deformed (displaced) outward in the radial direction from the neck portion 6c. This increases the strength of anchorage between the built-in component 26 and the tank body Ta. In addition, the deformation prevention structure can be easily formed because the only thing to do is to provide the first convex portion 26h.

Third Embodiment

Figure 17A:
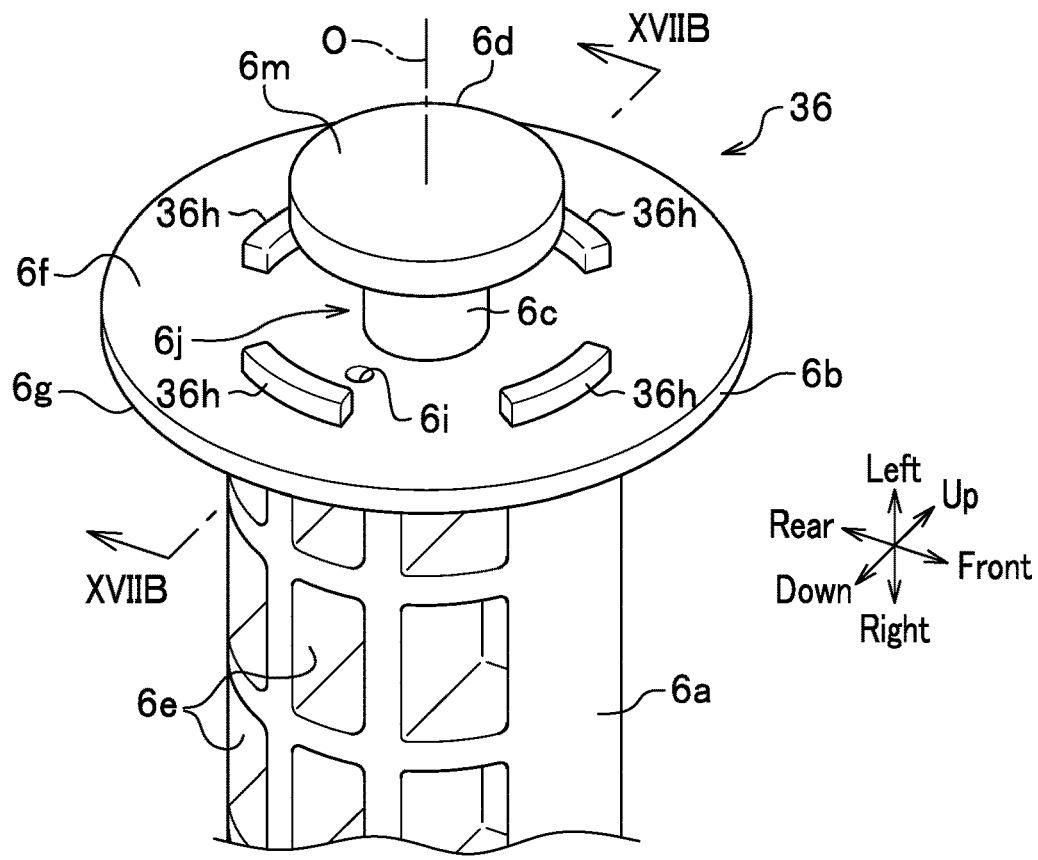
FIG. 17A is an overall perspective view of a built-in component included in a fuel tank according to a third embodiment of the present invention.
Figure 17B:
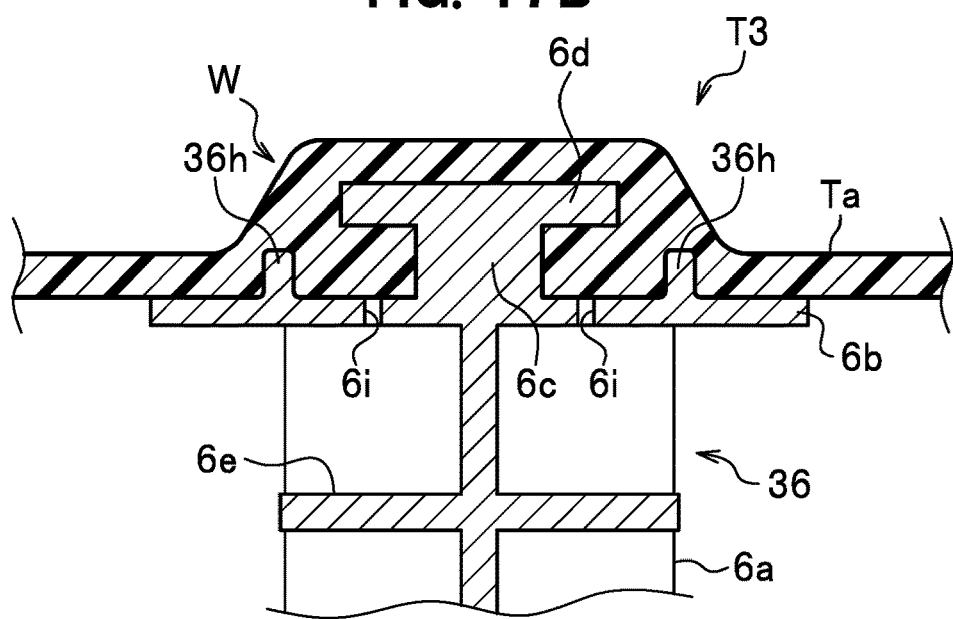
FIG. 17B is an enlarged cross-sectional view of the fuel tank according to the third embodiment of the present invention.

A third embodiment has a plurality of (here, four) second convex portions 36h formed on the front surface 6f of the shoulder portion 6b, as a deformation prevention structure, as shown in FIGS. 17A and 17B. The second convex portions 36h are arranged about the axis 0 circumferentially at equal intervals. The second convex portions 36h are each curved and each have a rectangular shape in cross section.

The third embodiment described above gives advantageous effects substantially equivalent to those of the first embodiment. That is, the parison S enters the space defined by the gap 6j and the second convex portions 36h, to prevent the resin around the neck portion 6c of a built-in component 36 (wrapping parison portion W) from being deformed. More specifically, the present embodiment has the resin around the neck portion 6c (wrapping parison portion W) received by the second convex portions 36h, to prevent the resin around the neck portion 6c from being deformed (displaced) outward in the radial direction from the neck portion 6c. This increases the strength of anchorage between the built-in component 36 and the tank body Ta. In addition, the deformation prevention structure can be easily formed because the only thing to do is to provide the second convex portion 36h.

Fourth Embodiment

Figure 18A:
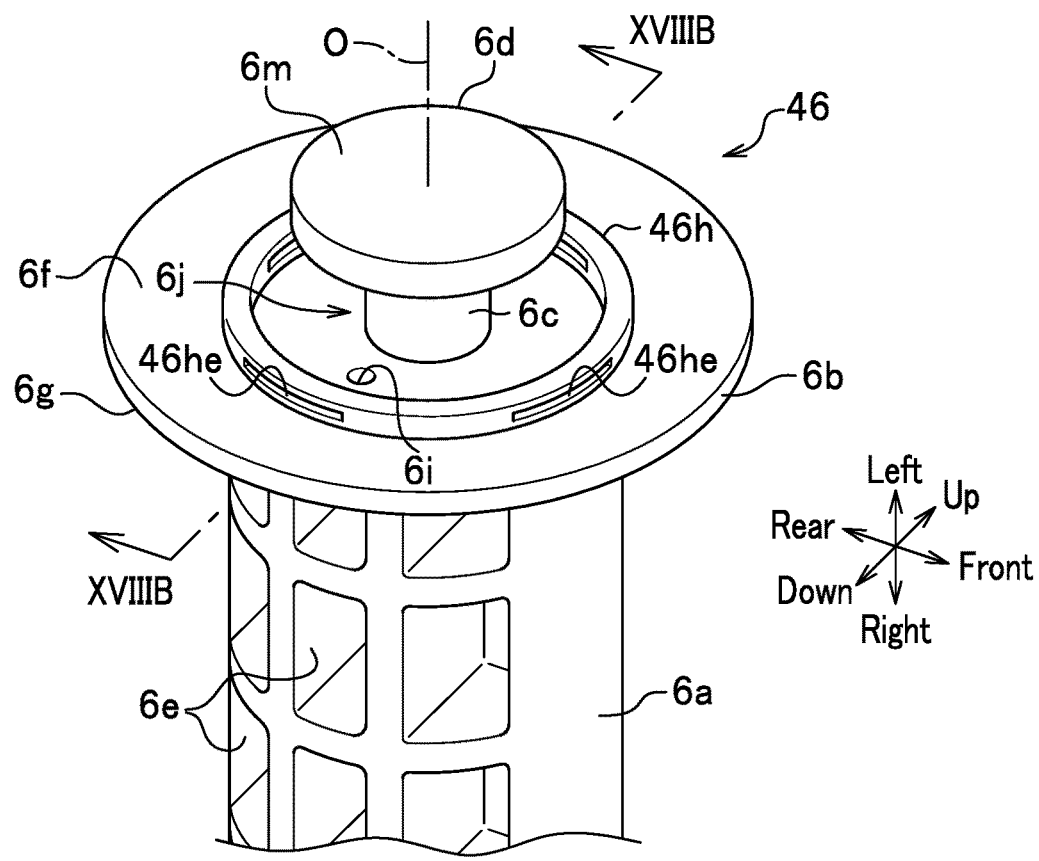
FIG. 18A is an overall perspective view of a built-in component included in a fuel tank according to a fourth embodiment of the present invention.
Figure 18B:
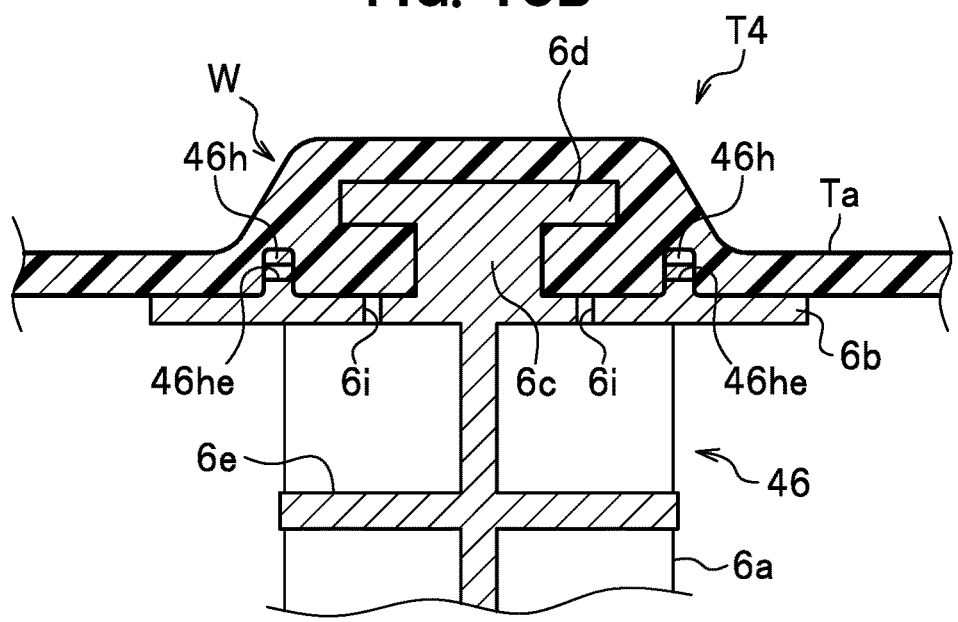
FIG. 18B is an enlarged cross-sectional view of the fuel tank according to the fourth embodiment of the present invention.

A fourth embodiment has a third convex portion 46h formed on the front surface 6f of the shoulder portion 6b as a deformation prevention structure, as shown in FIGS. 18A and 18B. The third convex portion 46h has an annular shape about the axis 0, and is formed to surround the whole circumference of the neck portion 6c. The third convex portion 46h has a rectangular shape in cross section. The third convex portion 46h has four through holes 46he formed in a circumferential direction thereof at equal intervals. The through holes 46he are portions where the parison S enters during molding. The through holes 46he are formed in the radial direction of a built-in component 46 so as to communicate an inner side of the third convex portion 46h with an outer side of the third convex portion 46h.

The fourth embodiment described above gives advantageous effects substantially equivalent to those of the second embodiment. In addition, in the fourth embodiment, the parison S also enters the through holes 46he during molding, to further increase the strength of anchorage.

Fifth Embodiment

Figure 19A:
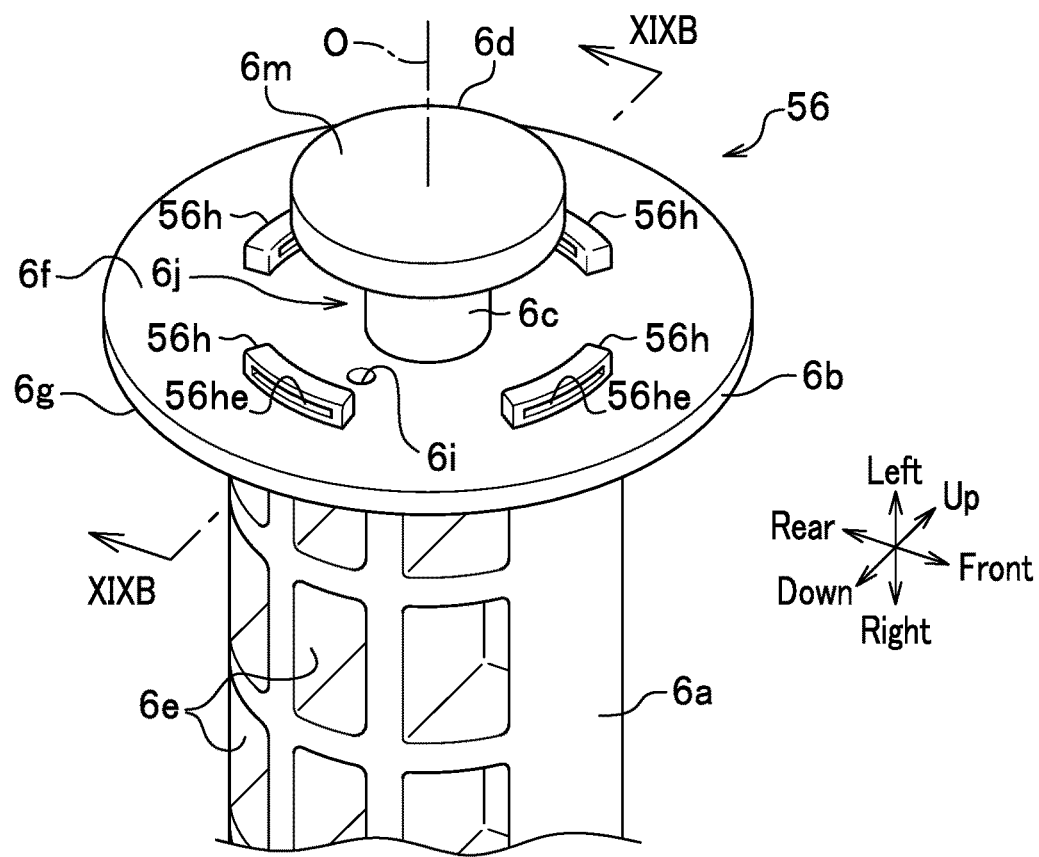
FIG. 19A is an overall perspective view of a built-in component included in a fuel tank according to a fifth embodiment of the present invention.
Figure 19B:
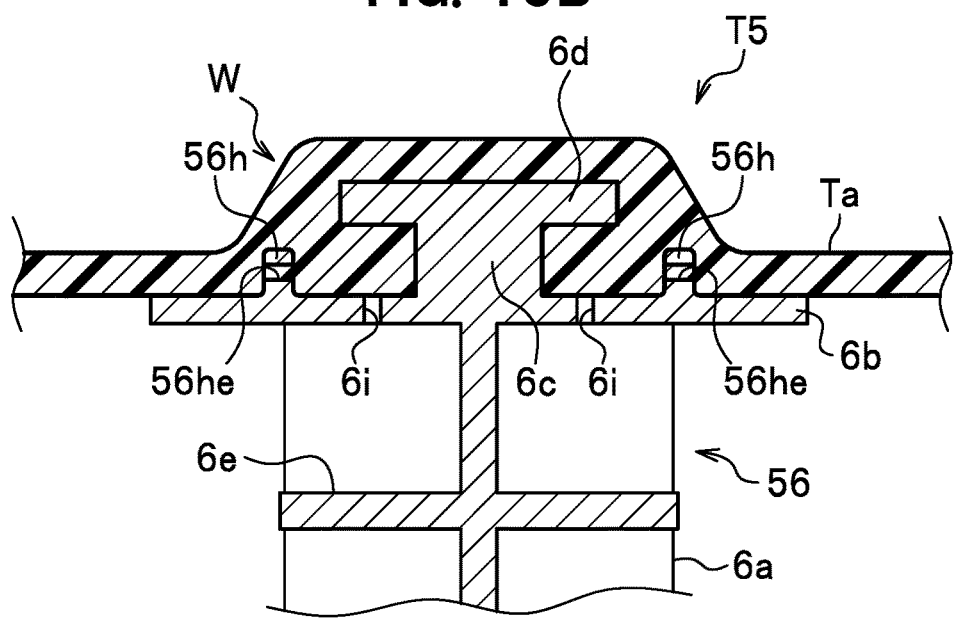
FIG. 19B is an enlarged cross-sectional view of the fuel tank according to the fifth embodiment of the present invention.

A fifth embodiment has a plurality of (here, four) fourth convex portions 56h formed on the front surface 6f of the shoulder portion 6b, as a deformation prevention structure, as shown in FIGS. 19A and 19B. The fourth convex portions 56h are arranged about the axis 0 circumferentially at equal intervals. The fourth convex portion 56h are each curved, and each have a rectangular shape in cross section. The fourth convex portions 56h each have a through hole 56he formed therein. The through holes 56he are portions where the parison S enters during molding. The through hole 56he is formed in the radial direction of a built-in component 56 so as to communicate an inner side of the fourth convex portion 56h with an outer side of the fourth convex portion 56h.

The fifth embodiment described above gives advantageous effects substantially equivalent to those of the third embodiment. In addition, in the fifth embodiment, the parison S also enters the through holes 56he during molding, to further increase the strength of anchorage.

Sixth Embodiment

Figure 20A:
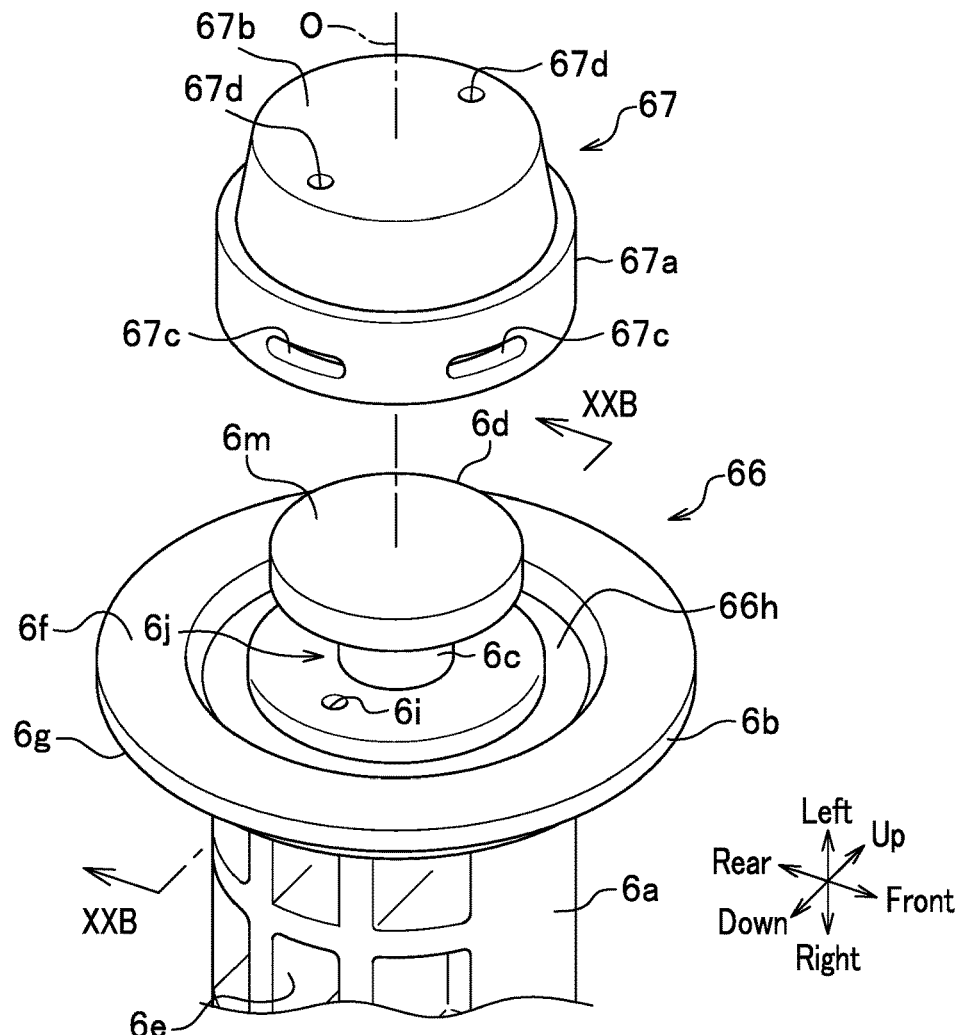
FIG. 20A is an overall perspective view of a built-in component included in a fuel tank according to a sixth embodiment of the present invention.
Figure 20B:
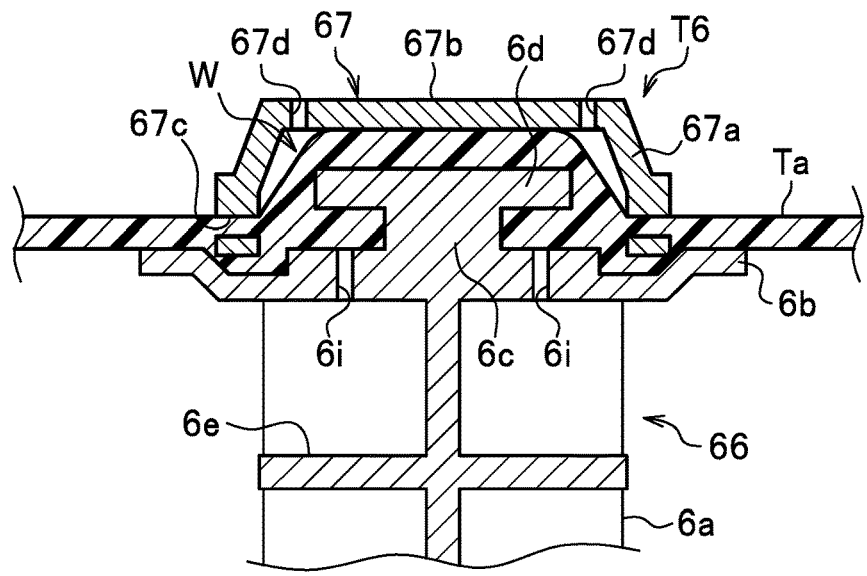
FIG. 20B is an enlarged cross-sectional view of the fuel tank according to the sixth embodiment of the present invention.

A sixth embodiment has a rigid member 67 integrally molded on the front surface 6f of the shoulder portion 6b, as a deformation prevention structure, as shown in FIGS. 20A and 20B. The rigid member 67 is inserted from outside the parison S shaped to a built-in component 66 and attached to the built-in component 66, during molding. The rigid member 67 is made of resin or metal.

The inside of the rigid member 67 has a shape corresponding to the head portion 6d and neck portion 6c, so that the rigid member 67 accommodates the head portion 6d and neck portion 6c. The rigid member 67 here has a bottomed cylindrical shape in which one end of the cylinder is closed, and mainly includes a peripheral wall portion 67a in a cylindrical shape and a bottom portion 67b in a disk shape. The front surface 6f of the shoulder portion 6b is formed therein with a groove 66h in an annular shape corresponding to the end of the peripheral wall portion 67a.

The peripheral wall portion 67a is formed therein with four through holes 67c circumferentially at equal intervals. The through hole 67c is a portion where the parison S enters during molding. The shapes, positions, number, and the like of the through holes 67c are not particularly limited as long as the parison S can enter the through holes 67c to fix the rigid member 67 to the tank body Ta.

The bottom portion 67b is formed therein with a plurality of (here, two) air holes 67d for blowing air into the rigid member 67. This allows, for example, for blowing air through the air holes 3g formed in the recess 3d (see FIG. 7) to generate the positive pressure P2 (second positive pressure) in the rigid member 67, so that the parison S is fed into the gap 6j between the shoulder portion 6b and head portion 6d and transferred. A gap may be defined between the rigid member 67 and the tank body Ta. Such a gap Is preferably defined between the through holes 67c and the tank body Ta so that water or the like entered into the rigid member 67 through the air holes 67d can be drained through the gap after the fuel tank T6 has been mounted on a means of transportation such as an automobile, a motorcycle, and a ship.

The sixth embodiment described above gives advantageous effects substantially equivalent to those of the first embodiment. That is, the parison S enters the gap 6j and the rigid member 67, to prevent the resin around the neck portion 6c of the built-in component 66 (wrapping parison portion W) from being deformed. More specifically, the present embodiment has the resin around the neck portion 6c (wrapping parison portion W) received by the rigid member 67, to prevent the resin around the neck portion 6c from being deformed (displaced) outward in the radial direction from the neck portion 6c. This increases the strength of anchorage between the built-in component 66 and the tank body Ta. In addition, the deformation prevention structure can be easily formed because only thing to do is to attach the rigid member 67.

Seventh Embodiment

Figure 21A:
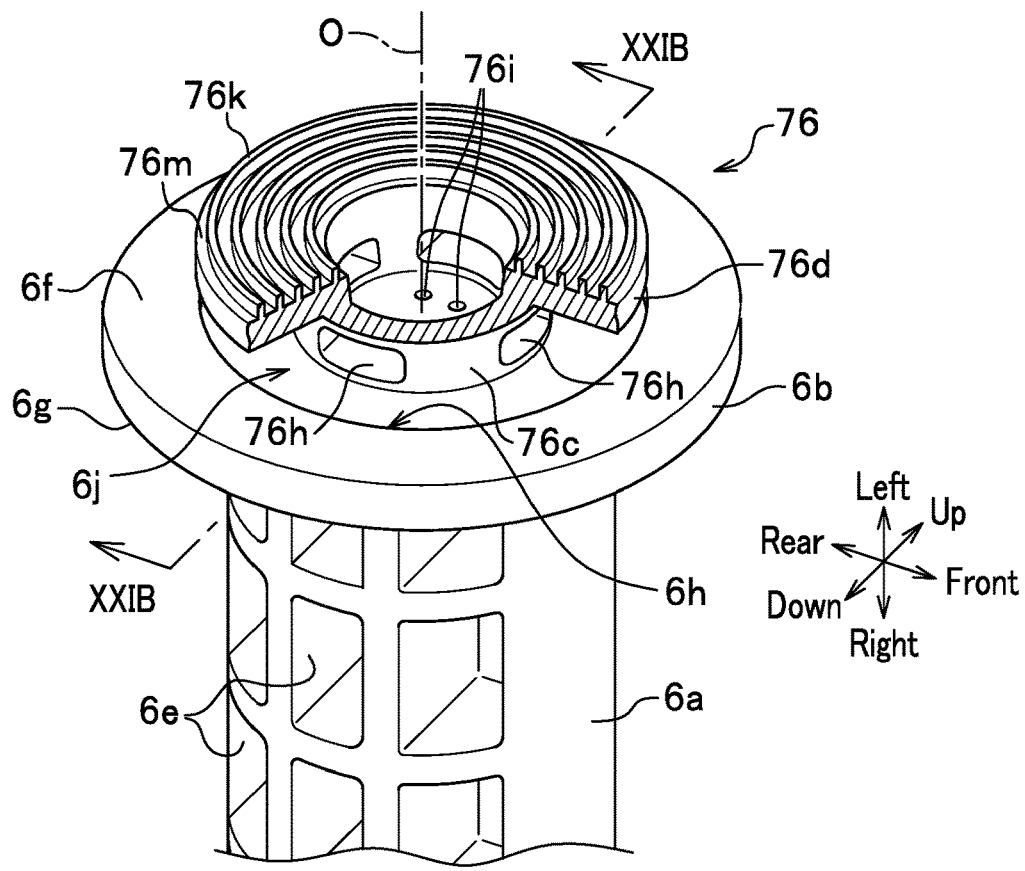
FIG. 21A is an overall perspective view of a built-in component included in a fuel tank according to a seventh embodiment of the present invention, with a head portion thereof partially broken.
Figure 21B:
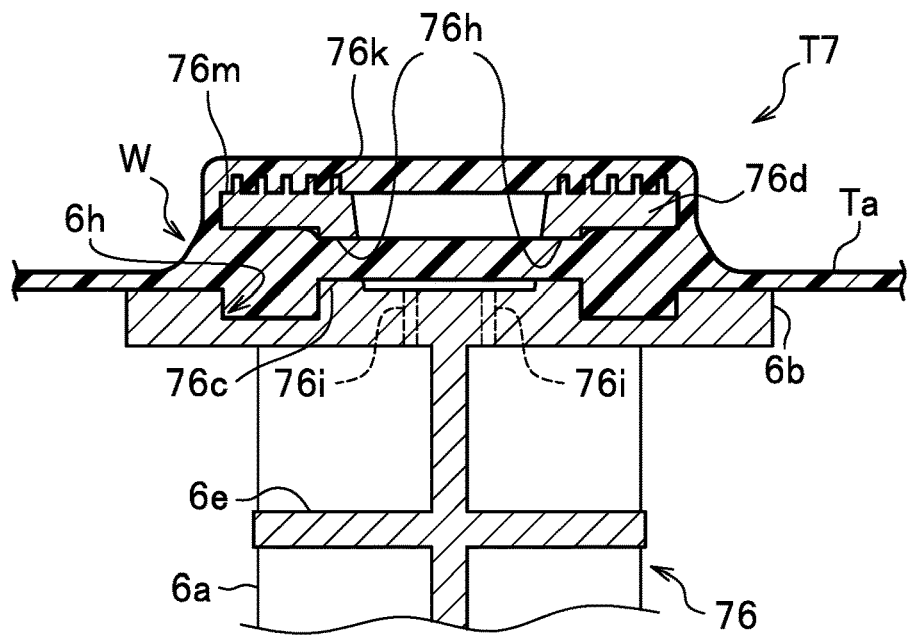
FIG. 21B is an enlarged cross-sectional view of the fuel tank according to the seventh embodiment of the present invention.

As shown in FIGS. 21A and 21B, a seventh embodiment has the stepped portion 6h as a deformation prevention structure, as with the first embodiment, but a head portion 76d and a neck portion 76c are configured differently from those of the first embodiment. A built-in component 76 includes the body portion 6a in a columnar shape, the shoulder portions 6b formed at both ends of the body portion 6a, the neck portions 76c formed on axially outer sides of the shoulder portions 6b, and the head portions 76d, as shown in FIG. 21A.

The neck portion 76c here has a cylindrical shape erecting from the front surface 6f of the shoulder portion 6b, and is formed with four through holes 76h circumferentially at equal intervals. The through holes 76h are portions where the parison S enters during molding. In addition, four air vent holes 76i are formed in the shoulder portion 6b surrounded by the neck portion 76c. The air vent holes 76i each communicate, at one end thereof, with the cutout holes 6e formed in the body portion 6a. This allows the air in the recesses 3d and 4d to be discharged outside the recesses 3d and 4d through the air vent holes 76i.

The head portion 76d has a ring shape made of a thin plate. A plurality of ribs 76k erecting in a ring shape are formed on a surface 76m of the head portion 76d. The ribs 76k are formed along circles about the axis 0. Note that the ribs 76k may be omitted.

The seventh embodiment described above gives advantageous effects substantially equivalent to those of the first embodiment. That is, the parison S enters the gap 6j and the stepped portion 6h, to prevent the resin around the neck portion 76c of the built-in component 76 (wrapping parison portion W) from being deformed. More specifically, the present embodiment has the resin around the neck portion 76c (wrapping parison portion W) received by the stepped portion 6h, to prevent the resin around the neck 76c from being deformed (displaced) outward in the radial direction from the neck portion 76c. This increases the strength of anchorage between the built-in component 76 and the tank body Ta. In addition, the present embodiment further increases the strength of anchorage because the parison S also enters the through holes 76h during molding. Further, the deformation prevention structure can be easily formed because the only thing to do is to provide the stepped portion 6h.

LEGEND FOR REFERENCE NUMERALS 6, 26, 36, 46, 56, 66, 76: built-in component; 6a: body portion; 6b: shoulder portion; 6c, 76c: neck portion; 6d, 76d: head portion; 6h: stepped portion (deformation prevention structure); 26h: first convex portion (deformation prevention structure); 36h: second convex portion (deformation prevention structure); 46h: third convex portion (deformation prevention structure); 56h: fourth convex portion (deformation prevention structure); 67: rigid member (deformation prevention structure); S, SA, SB: parison; T, T2 to T7: fuel tank; Ta: tank body; and W: wrapping parison portion.

The invention claimed is:

1. A fuel tank comprising:
a tank body; and
a built-in component including a head portion, a neck portion, and a shoulder portion, wherein
the built-in component is exclusively within an interior of the tank body and anchored to the tank body, with the head portion and the neck portion entirely covered by a part of the tank body,
the shoulder portion is formed with air vent holes,
the built-in component further includes: a deformation prevention structure preventing a wrapping portion of the tank body around the neck portion from being deformed due to pressure acting on the tank body,
the deformation prevention structure is provided on a surface of the shoulder portion, facing the neck portion, and fixes the wrapping portion to the built-in component, with the wrapping portion entered in a gap between the head portion and shoulder portion and air in the gap discharged through the air vent holes so as to fill the gap as the tank body is formed, and
the deformation prevention structure includes at least one of a stepped portion and a convex portion.

2. The fuel tank according to claim 1, wherein
the neck portion erects from a surface of the shoulder portion and exhibits a columnar shape.

3. A fuel tank comprising:
a tank body;
a built-in component including a head portion, a neck portion, and a shoulder portion; and
a deformation prevention structure preventing a wrapping portion of the tank body around the neck portion from being deformed due to pressure acting on the tank body, wherein
the built-in component is exclusively within an interior of the tank body of the fuel tank and anchored to the tank body, with the head portion and the neck portion entirely covered by a part of the tank body,
the shoulder portion is formed with air vent holes,
the deformation prevention structure is provided on a surface of the shoulder portion, facing the neck portion, and fixes the wrapping portion to the built-in component, with the wrapping portion entered in a gap between the head portion and shoulder portion and air in the gap discharged through the air vent holes so as to fill the gap as the tank body is formed, and the deformation prevention structure includes a rigid member integrally molded so as to cover, from outside, the head portion, the neck portion, and the wrapping portion.

* * * * *